US007237571B2

(12) United States Patent
Morimoto et al.

(10) Patent No.: US 7,237,571 B2
(45) Date of Patent: Jul. 3, 2007

(54) PULSATING VIBRATION AIR GENERATION APPARATUS

(75) Inventors: Kiyoshi Morimoto, Shizuoka (JP); Hirokazu Yoshimoto, Shizuoka (JP); Yasushi Watanabe, Shizuoka (JP); Kazue Murata, Hirakata (JP)

(73) Assignees: Kyowa Hakko Kogyo Co., Ltd., Chiyoda-ku, Tokyo (JP); Kabushikikaisha Matsui Seisakusho, Chuo-ku, Osaka-shi, Osaka (JP)

(*) Notice: Subject to any disclaimer, the term of this patent is extended or adjusted under 35 U.S.C. 154(b) by 403 days.

(21) Appl. No.: 10/492,535

(22) PCT Filed: Oct. 25, 2002

(86) PCT No.: PCT/JP02/11088

§ 371 (c)(1), (2), (4) Date: Nov. 18, 2004

(87) PCT Pub. No.: WO03/036102

PCT Pub. Date: May 1, 2003

(65) Prior Publication Data

US 2005/0076776 A1 Apr. 14, 2005

(30) Foreign Application Priority Data

Oct. 26, 2001 (JP) ............................ 2001-328642

(51) Int. Cl.
*B06B 1/18* (2006.01)
*B65G 53/66* (2006.01)

(52) U.S. Cl. ............................ 137/624.15; 137/624.13

(58) Field of Classification Search ........... 137/624.13, 137/624.15
See application file for complete search history.

(56) References Cited

U.S. PATENT DOCUMENTS

| | | | | |
|---|---|---|---|---|
| 6,053,203 | A * | 4/2000 | Sailor et al. | 137/624.13 |
| 6,062,826 | A | 5/2000 | Morimoto | |
| 6,607,008 | B1 | 8/2003 | Yoshimoto | |
| 6,962,169 | B2 * | 11/2005 | Kaske | 137/624.13 |

FOREIGN PATENT DOCUMENTS

| | | |
|---|---|---|
| JP | 52-029682 | 3/1977 |
| JP | 57-79747 | 5/1982 |
| JP | 58-61906 | 4/1983 |
| JP | 62-41912 | 3/1987 |
| JP | 7-136591 | 5/1995 |

* cited by examiner

*Primary Examiner*—Kevin Leo
(74) *Attorney, Agent, or Firm*—Bacon & Thomas, PLLC

(57) ABSTRACT

A pulsating vibration air generation apparatus capable of sharply and quickly controlling air flow in turning on and off operation, thereby generating a pulsating vibration air with sharp and hardly attenuated peak and valley, and capable of operation without occurrence of so much mechanical vibration. The pulsating vibration air generation apparatus is comprised of a main body having a tubular hollow space R2 with which two air communication ports are associated, and a rotary body situated for rotation in the tubular hollow space R2 and which has a peripheral side surface S4*c* so as to slide on the inner surface S2*c* forming the tubular hollow space R2.

10 Claims, 17 Drawing Sheets

PULSATING VIBRATION AIR GENERATION APPARATUS

TECHNICAL FIELD

The present invention relates to a pulsating vibration air generation apparatus, more specifically to a pulsating vibration air generation apparatus in which a pulsating vibration air sharply and quickly controlled in turning on and off operation at a fixed frequency with sharp and hardly attenuated peak and valley, and the apparatus itself is capable of generating a pulsating vibration air without so much vibration under still conditions.

BACKGROUND ART

The inventors of the present invention have engaged for a long time in the research and development of a pulsating vibration air and a pulsating vibration air generation apparatus for generating a pulsating vibration air and have developed several kinds of pulsating vibration air.

Here "pulsating vibration air" means a pulsating air flow of which the amount of air flow (air pressure) is vibrated in a fixed cycle and at a fixed amplitude, and includes a pulsating vibration air of positive pressure and a pulsating vibration air of negative pressure.

"Positive pressure" used in this specification means that the pressure inside the apparatus is higher than the pressure outside of the apparatus (for example, atmospheric pressure), and "negative pressure" means that the pressure inside the apparatus is lower than the pressure outside of the apparatus (for example, atmospheric pressure).

FIG. 13 is an explanatory view diagrammatically showing a pulsating vibration air of positive pressure. FIG. 13*a* shows a pulsating vibration air in which the peak amplitude is at the atmospheric pressure and the bottom amplitude is at negative pressure, and FIG. 13*b* shows a pulsating vibration air in which both of the peak amplitude and the bottom amplitude are at positive pressure.

When such a pulsating vibration air of positive pressure is used as a pneumatic transport air for pneumatically transporting a powder material for example, the accumulation or blow hole phenomena of the powder are not caused within a transport pipe and, thereby being preferably used as a pneumatic transport air for the pneumatic transportation of powder material. In addition, if it is used as an air for fluidizing the powder material supplied in a granulation tank of a fluid-bed granulation apparatus, blow hole phenomenon is hardly caused for the powder material put in a catch basin of the granulation tank, thereby being suitably used for a fluidizing air of the powder material put in the catch basin of the granulation tank of the fluid-bed granulation apparatus. Further, if it is used as a powder removing air of a powder removing apparatus, the powder adhering on the surface of tablets or other products is completely removed by the strong and weak exhaling action of the pulsating vibration air, thereby being preferably used as a powder removing air of the powder removing apparatus.

FIG. 14 is an explanatory view diagrammatically showing a pulsating vibration air of negative pressure, FIG. 14*a* shows a pulsating vibration air in which the bottom amplitude is at negative pressure and the peak amplitude is at the atmospheric pressure, and FIG. 14*b* shows a pulsating vibration air in which both of the peak amplitude and the bottom amplitude are at negative pressure.

If such a pulsating vibration air of negative pressure is used as a powder removing air of a powder removing apparatus, the powder adhering on the surface of tablets or other products is completely removed by the strong and weak inhaling function of the pulsating vibration air, thereby being preferably used as a powder removing air of the powder removing apparatus.

A typical embodiment of the pulsating vibration air generation apparatus which generates the pulsating vibration air shown in FIG. 13 and FIG. 14 and has been already proposed by the inventors of the present invention is exemplified below.

FIG. 15 is an explanatory view showing one embodiment of the pulsating vibration air generation apparatus that has been already proposed by the inventors of the present invention.

The pulsating vibration air generation apparatus 101 comprises a cylindrical case 102 and a valve 104, the valve 104 being rotatably provided at a rotary shaft 103 so as to divide the inside of the case 102 into two spaces R1 and R2, the rotary shaft 103 being provided so as to accord with a center axis of the case 102.

Two air communication ports h102*a* and h102*b* are provided in the case 102.

In this embodiment, the two air communication ports h102*a* and h102*b* are arranged on the case 102 right-angled by making the center of the case 102 into the peak.

Pipes T1 and T2 are connected to each one of the two air communication ports h102*a* and h102*b* respectively.

Air source (not shown) is connected to the pipe T1.

The member shown with the reference numeral 105 in FIG. 15 indicates a flow rate control means provided if necessary.

Rotary drive means such as an electric motor (not shown) is connected to the rotary shaft of the valve 104 to rotate the valve 104 at a fixed rotational speed by controlling the rotary drive means (not shown).

Next, the operation of the pulsating vibration air generation apparatus 101 is explained.

At first operation in, the case that a pulsating vibration air of positive pressure is generated in the pipe T2 is explained.

For generating a pulsating vibration air of positive pressure inside the pipe T2, an exhaling air source (not shown) is connected as the air source (not shown) to the pipe T1. As the exhaling air source (not shown), used are a gas tank in which gas such as air or nitrogen gas is bottled under pressure, a blower, and so on. If a blower is used as the air source (not shown), the discharge port of the blower is connected to the pipe T1.

Then, a compressed gas is supplied to the pipe T1 from the air source (not shown).

The valve 104 is rotated at a fixed rotation speed by rotating the rotary drive means (not shown) at a fixed rotation speed.

When the valve 104 is at the position shown with solid lines, the air communication ports h102*a* and h102*b* are communicated, so that the compressed gas supplied to the pipe T1 from the air source (not shown) is discharged from the air communication port h102*b* into the pipe T2 through the case 102.

On the other hand, when the valve 104 is at the position shown with imaginary lines (two-dot dashed line), the communication port h102*a* and h102*b* are not communicated, so that the compressed gas supplied to the pipe T1 from the air source (not shown) is not discharged into the pipe T2.

As the result of repeating these operations while driving the pulsating vibration air generation apparatus 101, a pulsating vibration air of positive pressure is generated in the pipe T2.

Next, the operation in the case that a pulsating vibration air of negative pressure is generated in the pipe T2 is explained.

For generating a pulsating vibration air of negative pressure inside the pipe T2, an inhaling air source (not shown) is connected as an air source (not shown) to the pipe T1. As the inhaling air source (not shown), used are a vacuum pump, a blower and so on. If a blower is used as the air source (not shown), the inhaling port of the blower is connected to the pipe T1.

Then, an inhaled gas directing from the case 202 to the air source (not shown) is generated in the pipe T1 by driving the air source (not shown).

The valve 104 is rotated at a fixed rotation speed by rotating the rotary drive means (not shown) at a fixed rotation speed.

When the valve 104 is at the position shown with solid lines, the air communication ports h102*a* and h102*b* are communicated, so that an inhaled gas flow (negative pressure) into the case 102 is generated in the pipe T2.

On the other hand, when the valve 104 is at the position shown with imaginary lines (two-dot dashed line), the communication ports h102*a* and h102*b* are not communicated, so that an inhaled gas flow (negative pressure) into the case 102 is not generated in the pipe T2.

As the result of repeating these operations while driving the pulsating vibration air generation apparatus 101, a pulsating vibration air of negative pressure is generated in the pipe T2.

FIG. 16 is an exploded perspective view explaining other embodiment of the pulsating vibration air generation apparatus that has been already proposed by the inventors of the present invention.

The pulsating vibration air generation apparatus 201 is comprised of a cylindrical case 202 and a drum-like rotary body 204 rotatably embraced in the case 202 in such a manner that the center shaft of the rotary body 204 coincides with the center axis of the case 202.

Two air communication ports h202*a* and h202*b* are provided at the side surface S202*c* of the case 202 in such a manner that they are positioned obliquely interposing the center axis so as to keep a fixed distance along the center axis of the case 202.

Bearing 205 to one tip of the rotary shaft 203*a* of the rotary body 204 rotatably emplaced in the case 202 is provided at the center of one end surface S202*a* of a pair of end surfaces S202*a* and S202*a* of the case 202. At the center of the other end surface S202*b*, a shaft hole (not shown) for inserting the other tip of rotary shaft 203*b* of the rotary body 204 is provided.

The drum-like rotary body 204 has the rotary shaft 203*a* and 203*b*.

The outer diameter of the drum-like rotary body 204 is equal to or a little smaller than the inner diameter of the case 202, so that the peripheral side surface S204*c* of the rotary body 204 slides on the inner surface of the case 202 when the rotary body 204 is rotated in the case 202.

Opening hole h204 is provided in the side surface of the rotary body 204.

The opening hole h204 is designed to fit where the air communication port h202*a* of the case 202 is provided when the tip of the rotary shaft 203*a* of the rotary body 204 is fitted in the bearing 205 of the case 202.

One end surface S204*a* of a pair of end surfaces S204*a* and S204*b* of the rotary body 204 is provided with the rotary shaft 203*a* projecting out of the end surface S204*a*.

Air communication holes h204*b*, h204*b*, h204*b*, and h204*b* are provided in the other end surface S204*b* of the rotary body 204.

The rotary axis 203*b* is provided so as to penetrate the other end S204*b* and project out of it.

In the pulsating vibration air generation apparatus 201, the rotary body 204 is rotatably embraced in the case 202 such that the rotary shaft 203*a* of the rotary body 204 is attached to the bearing 205 of the case 202. Then, the other end surface S204*b* is attached in such a manner that the rotary shaft 203*b* of the rotary body 204 is inserted in the shaft hole (not shown) formed in the other end surface S204*b*, so that the rotary body 204 is embraced in the case 202.

Pipes T1 and T2 are provided in the two air communication port h202*a* and h202*b* respectively.

Air source (not shown) is connected to the pipe T1.

Rotary drive means such as an electric motor (not shown) is connected to the rotary shaft 203*b* of the rotary body 204 so as to rotate the rotary body 204 at a fixed rotation speed by controlling the drive of rotary drive means (not shown).

Next, the operation of the pulsating vibration air generation apparatus 201 is explained.

At first, the operation in the case that a pulsating vibration air of positive pressure is generated in the pipe T2 is explained.

For generating a pulsating vibration air of positive pressure inside the pipe T2, an exhaling air source (not shown) is connected as an air source (not shown) to the pipe T1. As the exhaling air source (not shown), used are a gas tank in which gas such as air or nitrogen gas is bottled under pressure, a blower and so on. If a blower is used as the air source (not shown), the discharge port of the blower is connected to the pipe T1.

Then, a compressed gas is supplied to the pipe T1 from the air source (not shown).

The valve 204 is rotated at a fixed rotation speed by rotating the rotary drive means (not shown) at a fixed rotation speed.

When the opening hole h204*a* formed on the side surface of the rotary body 204 comes to the position of the air communication port h202*a* provided in the case 202, the air communication port h202*a* and h202*b* are communicated, so that the compressed gas supplied to the pipe T1 is discharged into the pipe T2 from the air communication port h102*b* of the case 202 through the air communication holes h204*b*, h204*b*, h204*b* and h204*b* of the other end surface S202*b* provided in the rotary body 204 and the inside of the drum-like rotary body 204.

On the other hand, the side surface of the rotary body (the area of the rotary body 204 other than where the opening hole h204*a* is provided) comes to the position of the air communication port of the rotary body 204 (the area of the rotary body 204 other than where the opening hole h204*a* is provided), so that the compressed gas supplied to the pipe T1 from the air source (not shown) is not discharged into the pipe T2.

As the result of repeating these operations while the pulsating vibration air generation apparatus 201 is driven, a pulsating vibration air of positive pressure is generated in the pipe T2.

Next, the operation in the case that a pulsating vibration air of negative pressure is generated in the pipe T2 is explained.

For generating a pulsating vibration air of negative pressure inside the pipe T2, an inhaling air source (not shown) is connected as an air source (not shown) to the pipe T1. As the inhaling air source (not shown), used are a vacuum pump, a blower and so on. If a blower is used as the air source (not shown), the inhaling port of the blower is connected to the pipe T1.

Then, an inhaled gas directing from the case 202 to the air source (not shown) is generated in the pipe T1 by driving the air source (not shown).

The rotary body 104 is rotated at a fixed rotation speed by rotating the rotary drive means (not shown) at a fixed rotation speed.

When the opening 204*a* formed on the side surface of the rotary body 204 comes to the position of the air communication port h202*a* provided in the case 202, the air communication holes port and h202*b* are communicated through the air communication holes h204*b*, h204*b*, h204*b* and h204*b* of the other end surface S204*b* provided in the rotary body 204 and the inside of the drum-like body 204, thereby generating an inhaled gas flow (negative pressure) into the case 202 in the pipe T2.

On the other hand, the side surface of the rotary body (the area of the rotary body 204 other than where the opening hole h204*a* is provided) comes to the position of the air communication port h202*a*, the air communication port h202*a* is closed by the side surface of the rotary body 204 (the area of the rotary body 204 other than where the opening hole h204*a* is provided), so that the air communication port h202*a* and h202*b* are not communicated. As the result, an inhaled gas flow (negative pressure) into the case 202 is not generated inside the pipe T2.

As the result of repeating these operations while driving the pulsating vibration air generation apparatus 201, a pulsating vibration air of negative pressure is generated inside the pipe T2.

FIG. 17 is an explanatory view showing other embodiment of the pulsating vibration air generation apparatus that has been already proposed by the inventors of the present invention.

The pulsating vibration generation apparatus 301 is provided with a tubular hollow space 302 having air communication port 302*a* and 302*b*, a valve seat 303 provided in the tubular hollow space 302, a valve 304 for opening and closing the valve seat 303, and a rotary cam 305 to move the valve 304 for opening and closing the valve seat 303.

Pipe T1 is connected to the air communication port 302*a* and a pipe T2 is connected to the air communication hole 302*a*.

Air source 311 is connected to the pipe T1.

The member shown with the reference numeral 312 in FIG. 17 is a flow rate control means provided if necessary.

The member shown with the reference numeral 302*c* in FIG. 17 is a pressure control port provided in the tubular hollow space 302 if necessary, and a pressure control valve 306 is provided in the tubular hollow space 302 for communicating with and blocking off the atmosphere.

The valve 304 has an axis body 304*a* and a roller 304*b* is rotatably provided at the lower end of the axis body 304*a*.

Axis containing hole h301 for containing the axis body 304*a* of the valve 304 airtightly and movably up and down is formed in a main body 301*a* of the pulsating vibration generation means 301.

The rotary cam 305 is comprised of an inner rotary cam 305*a* and an outer rotary cam 305*b*.

On each one of the inner rotary cam 305*a* and the outer rotary cam 305*b*, a fixed concavo-convex pattern is formed so as to keep a distance as wide as the diameter of the rotary roller 304*b*.

The rotary roller 304*b* is rotatably inserted between the inner rotary cam 305*a* and the outer rotary cam 305*b* of the rotary cam 305.

The member indicated with the reference numeral "ax" in FIG. 17 is a rotary axis of a rotary drive means such as a motor (not shown), and the rotary cam 305 is exchangeably attached to the rotating axis "ax".

Next, the operation of the pulsating vibration air generation apparatus 301 is explained.

At first, the operation in the case that a pulsating vibration air of positive pressure is generated in the pipe T2 is explained.

For generating a pulsating vibration air of positive pressure inside the pipe T2, an exhaling air source (not shown) is connected as an air source 311 to the pipe T1. As the exhaling air source (not shown), used are a gas tank in which gas such as air or nitrogen gas is bottled under pressure, a blower and so on. If a blower is used as the air source 311, the discharge port of the blower is connected to the pipe T1.

Then, an compressed gas is supplied to the pipe T1 from the air source 311.

The rotary cam 305 is rotated at a fixed rotation speed by rotating the rotary drive means (not shown) at a fixed rotation speed.

The rotary roller 304*b* is rotated between the inner rotary cam 305*a* and the outer rotary cam 305*b* of the rotary cam 305 which is driven to be rotated at a fixed rotation speed and moved up and down with high reproducibility, thereby opening and closing the valve seat 303 with the valve 304 in accordance with the concavo-convex pattern formed on the rotary cam 305.

As the result of repeating these operations while driving the pulsating vibration air generation apparatus 301, a pulsating vibration air of positive pressure is generated inside the pipe T2.

When the pressure control port 302*c* and the pressure control valve 306 are provided in the tubular hollow space 302, the pressure of pulsating vibration air of positive pressure supplied to the pipe T2 is regulated by appropriately controlling the pressure control valve 306 provided in the pressure control port 302*c*.

Then, the operation in the case that a pulsating vibration air of negative pressure is generated in the pipe T2 is explained.

For generating a pulsating vibration air of negative pressure inside the pipe T2, an inhaled air source (not shown) is connected as an air source 311 to the pipe T1. As the inhaled air source (not shown), used are a vacuum pump, a blower and so on. If a blower is used as the air source 311, the inhaling port of the blower is connected to the pipe T1.

Then, an inhaled gas directing from the case 202 to the air source 311 is generated inside the pipe T1 by driving the air source 311.

The rotary cam 305 is rotated at a fixed rotation speed by rotating the rotary drive means (not shown) at a fixed rotation speed.

The rotary roller 304*b* is rotated between the inner rotary cam 305*a* and the outer rotary cam 305*b* of the rotary cam 305 which is driven to be rotated at a fixed rotation speed and moved up and down with high reproducibility, thereby opening and closing the valve seat 303 with the valve 304 in accordance with the concavo-convex pattern formed on the rotary cam 305.

As the result of repeating these operations while the pulsating vibration air generation apparatus 301 is driven, a pulsating vibration air of negative pressure is generated in the pipe T2.

The above-mentioned pulsating vibration air generation apparatus 101, 201 and 301 do not have a problem of heating of an induction coil, which has been observed for a solenoid type electromagnetic valve. Therefore, comparing with the solenoid type electromagnetic valve, those apparatus have a merit in that a pulsating vibration air can be generated stably for a long time.

The pulsating vibration air generation apparatus 101 with the rotary type valve 104 and the pulsating vibration air generation apparatus 201 with the drum-type rotary body 204 have an advantage in that a mechanical vibration is hardly caused while generating a pulsating vibration air.

Further, the pulsating vibration air generation apparatus with a rotary cam 305 has a characteristic that because the valve seat 303 is opened and closed by moving the valve 304 up and down, a pulsating vibration air sharply and quickly turning on and off is generated inside the pipe T2, thereby generating a pulsating vibration air of which peak or valley is hardly attenuated.

However, as far as the inventors of the present invention know, there hasn't been developed a pulsating vibration air generation apparatus which is capable of generating inside a pipe a pulsating vibration air sharply and quickly controlled in turning on and off, and the peak and valley of which is hardly attenuated; and which does not cause any remarkable mechanical vibration as the pulsating vibration air generation apparatus 101 with the rotary type valve 104 and as the pulsating vibration air generation apparatus 201 with the drum-type rotary body 204.

Particularly in the case that the pipe for pneumatically transporting a powder is too long or the pipe connecting the granulation tank of a fluid-bed granulation apparatus or a powder removing apparatus with a pulsating vibration air generation apparatus is too long, it is required to be capable of sharply and quickly controlling air flow in turning on and off operation, and generating a pulsating vibration air with sharp and hardly attenuated peak and valley.

When a mechanical vibration is generated in the pulsating vibration air generation apparatus while a pulsating vibration air is generated by means of the pulsating vibration air generation apparatus, the mechanical vibration caused in the apparatus spreads over a pneumatic transportation apparatus, a fluid-bed granulation apparatus, a powder removing apparatus and so on via a pipe, thereby generating a phenomenon such that the entire apparatus similar to a pneumatic transportation apparatus, a fluid-bed granulation apparatus, a powder removing apparatus and so on is vibrated.

SUMMARY OF THE INVENTION

The present invention has been proposed to solve the above-mentioned problems. An object of the present invention is to provide a pulsating vibration air generation apparatus capable of sharply and quickly controlling air flow in turning on and off operation, and generating a pulsating vibration air with sharp and hardly attenuated peak and valley and also capable of preventing so much mechanical vibration under still conditions while generating a pulsating vibration air similar to the pulsating vibration air generation apparatus 101 using the rotary type valve 104 and the pulsating vibration air generation apparatus 201 using the drum-type rotary body 204.

The pulsating vibration air generation apparatus according to the present invention comprises a main body of pulsating vibration air generation apparatus having a tubular hollow space in which two air communication ports are provided, one of the two air communication ports being connected to an air source, and a cylindrical rotary body rotatably embraced in the tubular hollow space of the main body of pulsating vibration air generation apparatus, the cylindrical rotary body comprising a rotary shaft at a position in alignment with the center axis of the tubular hollow space and a peripheral side surface formed so as to slide on the surface forming the tubular hollow space of the main body, the rotary shaft being connected to a rotary source for rotating the rotary shaft, and the cylindrical rotary body further comprising an air communication passage penetrating the cylindrical rotary body, wherein the pulsating vibration air generating apparatus generates pulsating vibration air inside a pipe connected to the other of the two air communication port of the main body by rotating the cylindrical rotary body by the rotary drive source while driving the air source.

In the pulsating vibration air generation apparatus, the rotary body is rotated in such a manner that the peripheral side of the rotary body slides on the inner surface forming the tubular hollow space provided in the main body of pulsating vibration air generation apparatus.

Therefore, so far as the two air communication ports provided in the main body of pulsating vibration air generation apparatus are not communicated by means of a through hole provided in the rotary body, the compressed gas supplied from one of the two air communication ports provided in the main body of pulsating vibration air generation apparatus is not discharged from the other of the two air communication ports.

As mentioned above, according to the pulsating vibration air generation apparatus, the following phenomena are repeated. That is, in the case the rotary body is rotated at a fixed rotation speed in the tubular hollow space provided in the main body of pulsating vibration air generation apparatus, the compressed gas supplied from one of the two air communication ports provided in the main body is discharged from the other of the air communication ports only when both of the two air communication ports provided in the main body are communicated through the communication passage provided in the rotary body accompanied by the rotation of the rotary body. When both of the two air communication ports provided in the main body of pulsating vibration air generation apparatus are not communicated, the compressed gas supplied from one of the two air communication ports provided in the main body is not discharged from the other of the air communication ports.

As a result, with this pulsating vibration air generation apparatus, the compressed gas fed from one of the two air communication ports provided in the main body of pulsating vibration air generation apparatus is supplied, the rotary body is rotated at a fixed rotation speed in the tubular hollow space provided in the main body, a pulsating vibration air of positive pressure sharply and quickly controlled in turning on and off operation at a fixed frequency with sharp and hardly attenuated peak and valley can be generated from the other of the two air communication ports provided in the main body.

Open and close operations of the two air communication ports provided in the main body of pulsating vibration air generation apparatus are achieved by the rotation of the rotary body having the communication passage, therefore, the pulsating vibration air generation apparatus itself hardly causes so much vibration while a positive pulsating vibration air is generated.

As far as the two air communication ports provided in the main body of pulsating vibration air generation apparatus are not communicated by the communication passage of the rotary body, even when one of the two air communication holes provided in the main body is inhaled, an inhaled air flow generated by inhaling the one of the air communication port is not generated at the other of the air communication ports.

As mentioned above, according to the pulsating vibration air generation apparatus, the following phenomena are repeated. That is, in the case one of the two air communication ports provided in the main body of pulsating vibration air generation apparatus is inhaled, and the rotary body is rotated at a fixed rotation speed in the tubular hollow space provided in the main body of pulsating vibration air generation apparatus, only when both of the two air communication ports provided in the main body are communicated through the communication passage provided in the rotary body accompanied by the rotation of the rotary body, an inhaled air flow is generated at the other of the two air communication holes of the main body. When both of the two air communication ports provided in the main body of pulsating vibration air generation apparatus are not communicated, the inhaled air flow is not generated at the other of the two air communication ports of the main body.

As a result, with this pulsating vibration air generation apparatus, when one of the two air communication ports provided in the main body of pulsating vibration air generation apparatus is inhaled, and the rotary body is rotated at a fixed rotation speed in the tubular hollow space provided in the main body, a pulsating vibration air of negative pressure sharply and quickly controlled in turning on and off operation at a fixed frequency with sharp and hardly attenuated peak and valley can be generated from the other one of the two air communication holes provided in the main body.

Open and close operations of the two air communication ports provided in the main body of pulsating vibration air generation apparatus are achieved by the rotation of the rotary body having the communication passage, therefore, the pulsating vibration air generation apparatus itself hardly causes any remarkable vibration while a negative pulsating vibration air is generated.

The pulsating vibration air generation apparatus according to the present invention is a pulsating vibration air generation apparatus in which both of the outer surfaces of the main body are formed flat, where each one of the two air communication ports is provided.

In such a pulsating vibration air generation apparatus, both of the outer surfaces of the main body are formed flat, where each one of the two air communication ports is provided, therefore, there generates no gap between the communication port provided in the main body of pulsating vibration air generation apparatus and each pipe when a pipe is connected to each one of the two air communication ports of the main body respectively.

Therefore, dust and other powder are not gathered at the connected part between each pipe and the main body of pulsating vibration air generation apparatus, thereby keeping the pulsating vibration air generation apparatus clean. Further, the clean room or other room in which the pulsating vibration air generation apparatus is provided is kept clean for a long time.

The pulsating vibration air generation apparatus according to the present invention is a pulsating vibration air generation apparatus, wherein the air source of the pulsating vibration air generation apparatus is an exhaling air source.

In this pulsating vibration air generation apparatus, the above-mentioned pulsating vibration air generation apparatus is used, and the exhaling air source is connected to one of the two air communication ports of the main body of pulsating vibration air generation apparatus, when the compressed air source is driven to rotate the rotary body at a fixed rotation speed in the main body, a pulsating vibration air of positive pressure sharply and quickly controlled in turning on and off operation at a fixed frequency with sharp and hardly attenuated peak and valley can be generated from the other one of the two air communication holes provided in the main body.

Open and close operations of the two air communication ports provided in the main body of pulsating vibration air generation apparatus are achieved by the rotation of the rotary body having the communication passage, therefore, the pulsating vibration air generation apparatus itself hardly causes any remarkable vibration while a positive pulsating vibration air is generated.

The pulsating vibration air generation apparatus according to the present invention is a pulsating vibration air generation apparatus, wherein the air source of the pulsating vibration air generation apparatus is an inhaling air source.

In this pulsating vibration air generation apparatus, the above-mentioned pulsating vibration air generation apparatus is used, and the inhaled air source is connected to one of the two air communication ports of the main body of pulsating vibration air generation apparatus, when the inhaled air source is driven to rotate the rotary body at a fixed rotation speed in the main body, a pulsating vibration air of negative pressure sharply and quickly controlled in turning on and off operation at a fixed frequency with sharp and hardly attenuated peak and valley can be generated from the other one of the two air communication holes provided in the main body.

Open and close operations of the two air communication ports provided in the main body of pulsating vibration air generation apparatus are achieved by the rotation of the rotary body having the communication passage, therefore, the pulsating vibration air generation apparatus itself hardly causes any remarkable vibration while a negative pulsating vibration air is generated.

The pulsating vibration air generation apparatus according to the present invention is a pulsating vibration air generation apparatus, wherein a packing member for airtightly sealing between the rotary shaft and a shaft hole formed in the main body of pulsating vibration air generation apparatus is provided.

In this pulsating vibration air generation apparatus, the packing member is provided in airtightly sealing between the rotary shaft and the shaft hole formed in the main body of pulsating vibration air generation apparatus. When a compressed gas is supplied from one of the two air communication ports provided in the main body of pulsating vibration air generation apparatus in order to produce a pulsating vibration air of positive pressure, the compressed gas thus supplied from the one of the two air communication ports does not leak to the atmosphere from between the rotary shaft and the shaft hole formed in the main body. In addition, when one of the two air communication holes provided in the main body of pulsating vibration air generation apparatus is inhaled in order to produce a pulsating vibration air of negative pressure, the atmospheric air is not inhaled into the main body from between the rotary shaft and the shaft hole formed in the main body.

Therefore, according to such constructed pulsating vibration air generation apparatus, even when a positive pulsating vibration air is generated or a negative pulsating vibration air is generated, a positive pulsating vibration air or a negative pulsating vibration air can be generated while reducing the energy loss against the driving amount of air source (an exhaling air source for generating a positive pulsating vibration air and an inhaling air source for generating a negative pulsating vibration air).

BRIEF DESCRIPTION OF DRAWINGS

FIG. 6 is an explanatory view diagrammatically showing the phenomenon caused in the main body of pulsating vibration air generation apparatus in FIG. 1.

FIG. 7 is an explanatory view showing other embodiment of a pulsating vibration air generation apparatus according to the present invention.

FIG. 13 is an explanatory view diagrammatically showing a pulsating vibration air of positive pressure.

FIG. 14 is an explanatory view diagrammatically showing a pulsating vibration air of negative pressure.

DESCRIPTION OF THE PREFERRED EMBODIMENTS

Now, a pulsating vibration air generation apparatus according to the present invention is further explained referring to the attached drawings.

Figure 1:
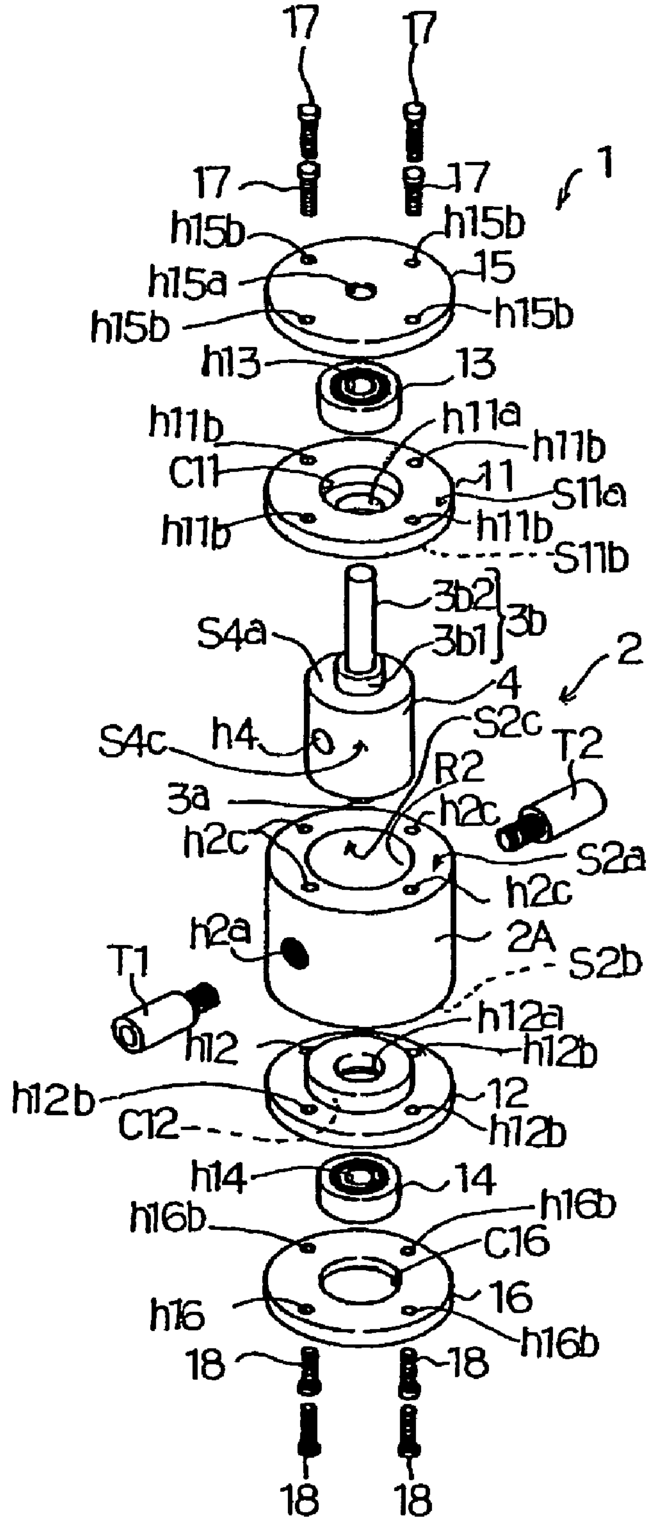
FIG. 1 is an exploded perspective view diagrammatically showing one embodiment of a pulsating vibration air generation apparatus according to the present invention.
Figure 2:
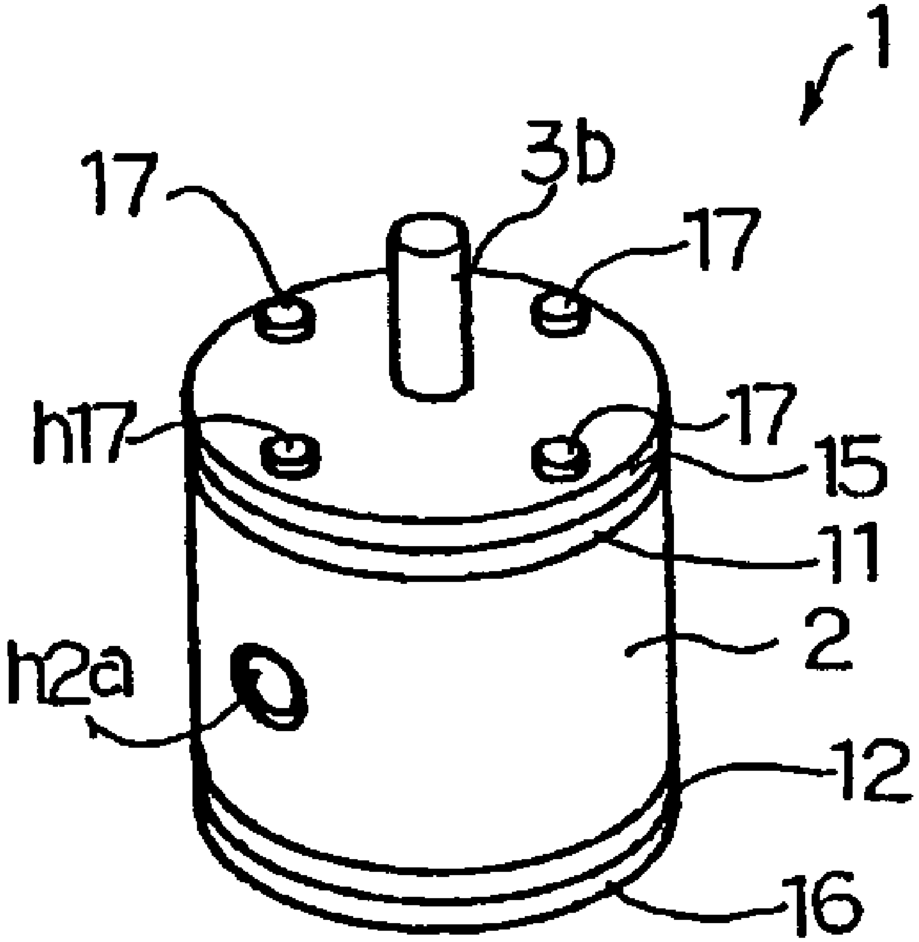
FIG. 2 is a perspective view diagrammatically showing the appearance of the pulsating vibration air generation apparatus of FIG. 1.
Figure 3:
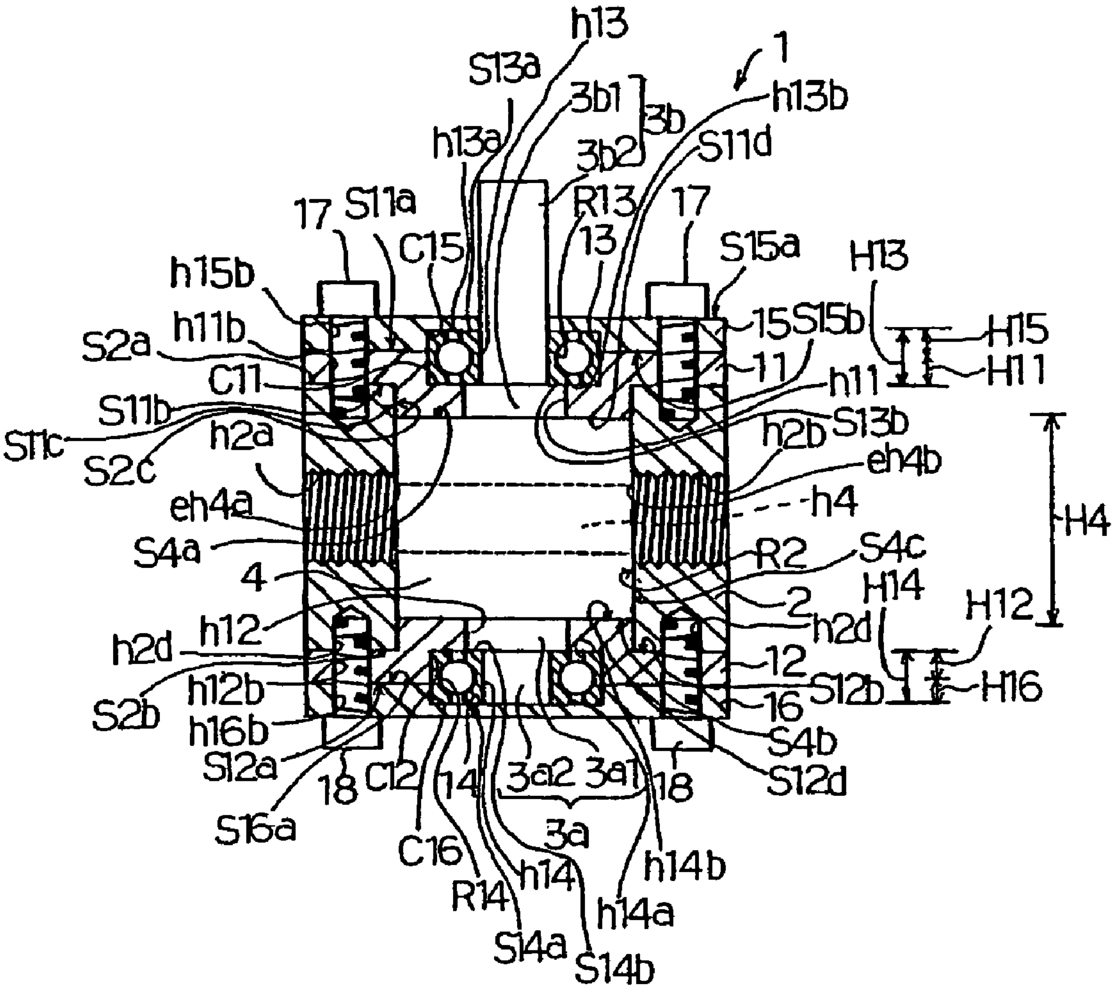
FIG. 3 is a sectional view diagrammatically showing the pulsating vibration air generation apparatus of FIG. 1.
Figure 4:
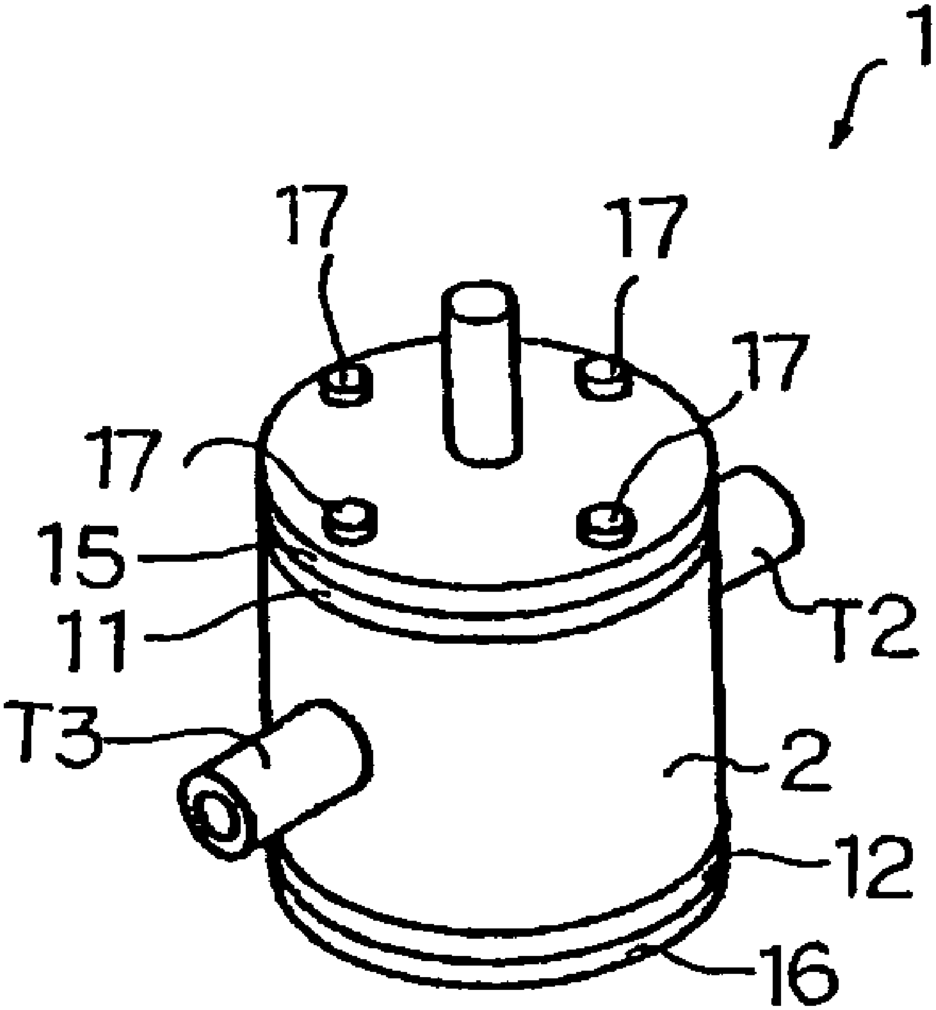
FIG. 4 is a perspective view of the appearance showing how a pipe is connected to each one of the two air communication ports provided in the pulsating vibration air generation apparatus in FIG. 1.
Figure 5:
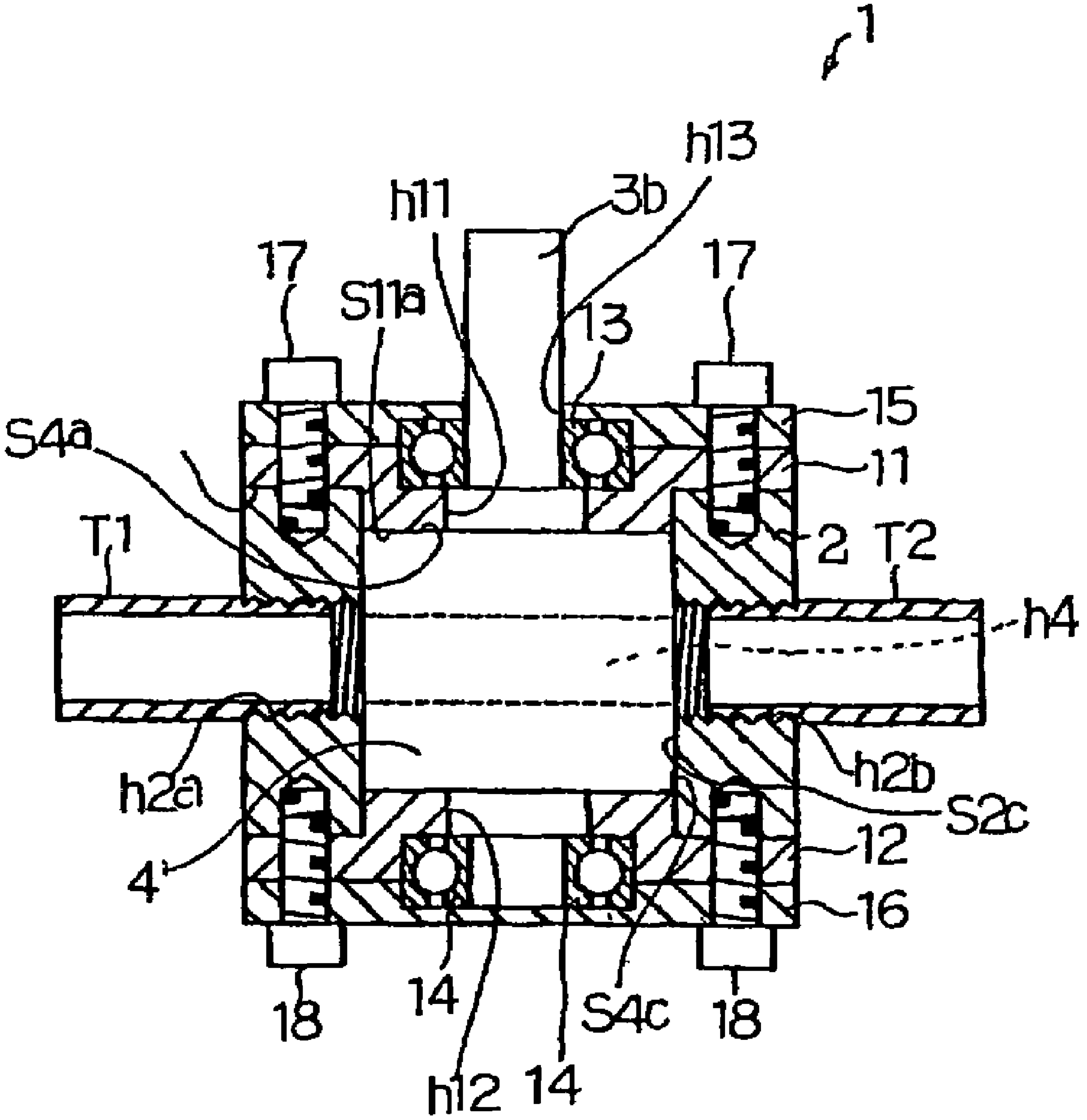
FIG. 5 is a sectional view showing how the pipe is connected to each one of the two air communication ports provided in the pulsating vibration air generation apparatus in FIG. 1.

FIG. 1 is an exploded perspective view diagrammatically showing one embodiment of a pulsating vibration air generation apparatus according to the present invention. FIG. 2 is a perspective view diagrammatically showing the appearance of the pulsating vibration air generation apparatus of FIG. 1. FIG. 3 is a sectional view diagrammatically showing the pulsating vibration air generation apparatus of FIG. 1. FIG. 4 is a perspective view of the appearance showing how a pipe is connected to each one of two air communication ports provided in the pulsating vibration air generation apparatus in FIG. 1. FIG. 5 is a sectional view showing how the pipe is connected to each one of the two air communication ports provided in the pulsating vibration air generation apparatus in FIG. 1.

The pulsating vibration air generation apparatus 1 has a main body of pulsating vibration air generation apparatus 2 and a cylindrical rotary body 4.

At first, the shape and structure of the main body of pulsating vibration air generation apparatus 2 are explained.

The main body of pulsating vibration air generation apparatus 2 is cylindrical and has a main body 2A of the apparatus, covers 11 and 12 for sealing a pair of end surfaces of the main body 2A of the apparatus, respectively, packing members 13 and 14 to be fitted in each one of the covers 11 and 12, and covers 15 and 16 for sealing packing members.

The main body of pulsating vibration air generation apparatus 2 (more specifically, the main body 2A of the apparatus) is made of metal such as stainless steel and has a tubular hollow space R2.

Two air communication ports h2*a* and h2*b* (see the air communication ports h2*b* in FIG. 3) are provided in the tubular hollow space R2.

Inner surface S2*c* forming the tubular hollow space R2 of the main body of pulsating vibration air generation apparatus 2 (more specifically, the main body 2A of the apparatus) is mirror finished in such a manner that the side surface S4*c* of the rotary body 4 (more specifically a main member 4A of the rotary body) smoothly slides on the inner surface S2*c* constituting the tubular hollow space R2 of the main body of pulsating vibration air generation apparatus 2 (more specifically, the main body 2A of the apparatus), so that the rotary body 4 (more specifically a main member 4A of the rotary body) is easily rotated in the tubular hollow space R2 in the main body of pulsating vibration air generation apparatus 2 (more specifically, the main body 2A of apparatus).

An air source (not shown) is connected to the one air communication port h2*a* of the two air communication ports h2*a* and h2*b* via a pipe T1.

Pipe T2 indicates a pipe where a pulsating vibration air is generated.

Bolt holes h2*c* . . . for screwing with fixing means 17 . . . such as bolts are formed on a first surface S2*a* of the main body 2A of the apparatus. Further, bolt holes (see bolt holes h2*d* and h2*d* in FIG. 3) for screwing with fixing means 18 . . . such as bolts are formed on a second surface S2*b* of the main body 2A of the apparatus (see the second surface S2*b* in FIG. 3).

In this embodiment, the connection between the pipe T1 and the air communication port h2*a* is achieved by screwing one end of the pipe t1 with a thread into the air communication port h2*a* having a thread inside. Further, the connection between the pipe T2 and the air communication port h2*b* is achieved by screwing the end of the pipe T2 with a thread into the air communication port h2*b* having a thread inside.

The cover 11 is disc-shaped, made of metal such as stainless steel, the outer diameter of which is the same or substantially the same diameter as that of the main body 2A of the apparatus, and the cover 11 has a concave part C11 for containing the packing member 13.

The concave part for containing packing member (see the concave part C12 for containing packing member in FIG. 3) is disk-shaped in a plan view.

The outer diameter of the concave part for containing packing member (see the concave part C11 for containing packing member in FIG. 3) provided in the cover 11 is the same as or is a litter smaller than the diameter of the tubular hollow space R2 provided in the main body 2A of the apparatus. When the cover 11 is attached to the main body 2A of the apparatus, the outer part of the concave part for containing packing member (see the concave part C11 for containing packing member in FIG. 3) provided in the cover 11 is fitted in the tubular hollow space R2 provided in the main body 2A of the apparatus.

The surface S11*d*, the outer part of the concave part for containing packing member (see the concave part C12 for containing packing member in FIG. 3) provided in the cover 11 on which the first surface S4*a* of the rotary body 4 (more specifically, the main member 4A of the rotary body) slides is mirror finished in such a manner that the end surface S4*a* of the rotary body 4 (more specifically, the main member 4A of the rotary body) is rotated while smoothly sliding on the surface S11*d* in the tubular hollow space R2 in the main body of pulsating vibration air generation apparatus 2 (more specifically, the main body 2A of the apparatus).

Further, the first surface S11*a* of the cover 11 is also mirror finished, so that the cover 1 and the cover 15 for sealing packing member are air tightly contacted when the cover 15 for sealing packing member is attached to the cover 11.

The second surface S11*b* and the side surface S11*c* forming the outer part of the concave part for containing packing member (see the concave part C11 for containing packing member in FIG. 3) provided in the cover 11 are mirror finished, so that the cover 11 and the main body 2A of the apparatus are airtightly contacted when the cover 11 is attached to the main bodybody 2A of the apparatus.

A shaft hole h11*a* for inserting a rotary shaft 3*b* of the rotary body 4 is formed in the center of the cover 11 (more specifically, at the bottom of the concave part C11 for containing packing body).

Bolt holes h11*b* . . . are formed on the cover 11 in order to attach the cover 11 to the main body 2A of the apparatus by means of fixing means 17 . . . .

The cover 12 is disc-shaped, made of metal such as stainless steel, the outer diameter of which is the same as or substantially the same as that of the main body 2A of the apparatus, and has the same size and the shape as the cover 11.

The cover 12 has a concave partbody (seethe concave part C12 for containing packing body in FIG. 3) for containing the packing body 14.

The concave part for containing packing body (seethe concave part C12 for containing packing body in FIG. 3) is disc-shaped in a plan view.

The surface S12*d*, the outer part of the concave part for containing packing member (seethe concave part C12 for containing packing member in FIG. 3) provided in the cover 12 on which the second surface S4*b* of the rotary body 4 (more specifically, the main member 4A of the rotary body) slides is mirror finished in such a manner that the second surface S4*b* of the rotary body 4 (more specifically, the main member 4A of the rotary body) smoothly slides on the surface S12*d* in the tubular hollow space R2 in the main body of pulsating vibration air generation apparatus 2 (more specifically, the main body 2A of the apparatus).

Further, the first surface S12*a* of the cover 12 is also mirror finished, so that the cover 12 and the cover 16 for sealing packing member are airtightly contacted when the cover 16 for sealing packing member is attached to the cover 12.

The second surface S12*b* and the side surface S12*c* forming the outer part of the concave part for containing packing member (see the concave part C12 for containing packing member in FIG. 3) provided in the cover 12 are mirror finished, so that the cover 12 and the main body 2A of the apparatus are airtightly contacted when the cover 12 is attached to the main body 2A of the apparatus.

A shaft hole h12*a* for inserting a rotary shaft of the rotary body 4 (rotary axis 3*a* in FIG. 3) is formed in the center of the cover 12 (more specifically, the concave part for containing packing member (see the concave part C12 for containing packing member in FIG. 3)).

Bolt holes h12*b* . . . are formed on the cover 12 in order to attach the cover 12 to the main body 2A of the apparatus by means of fixing means 18 . . . .

The outer diameter of the concave part for containing packing member (see the concave part C12 for containing packing member in FIG. 3) provided in the cover 12 is the same as or is a little smaller than the diameter of the tubular hollow space R2 provided in the main body 2A of the apparatus. When the cover 12 is attached to the main body 2A of the apparatus, the outer part of the concave part for containing packing member (see the concave part C12 for containing packing member in FIG. 3) provided in the cover 12 is fitted in the tubular hollow space R2 provided in the main body 2A of the apparatus.

Packing member 13 is disc-shaped.

A shaft hole h13 for inserting the rotary shaft 3*b* of the rotary body 4 is provided at the center of the packing member 13.

This embodiment uses a packing member which is made of hard silicone rubber and of which outer diameter is the same as or a little smaller than the inner diameter of the concave part C11 for containing packing member provided in the cover 11 as the packing member 13.

In this embodiment, the packing member 13 is constructed in order to prevent the packing member 13 from resisting rotation of the rotary body 4, such that a cut-out portion R13 in the shape of ring is formed so as to surround the circumference of the shaft hole h13 aiming to reduce the weight, a ring-like through hole h13*a* is formed for the cut-out portion R13 so as to penetrate the first surface S13*a* of the packing member 13 and the cut-out portion 13, and a ring-like through hole h13*b* is formed for the cut-out portion R13 so as to penetrate the second surface S13*a* of the packing member 13 and the cut-out portion 13 to facilitate the elastic deformation of the packing member 13.

Packing member 14 is also disc-shaped.

A shaft hole h14 for inserting the rotary shaft 3*a* of the rotary body 4 is formed in the center of the packing member 14.

This embodiment uses a packing member which is made of hard silicone rubber and the outer diameter of which is the same as or a little smaller than the inner diameter of the concave part for containing packing member provided in the cover 12 as the packing member 14.

In this embodiment, the packing member 14 is constructed in order to prevent the packing member 14 from resisting rotation of the rotary body 4, such that a cut-out portion R14 in the shape of ring is formed so as to surround the circumference of the shaft hole h14 aiming to reduce the weight, a ring-like through hole h14*a* is formed for the cut-out portion R14 so as to penetrate the first surface S14*a* of the packing member 14 and the cut-out portion 14 to facilitate the elastic deformation of the packing member 14, and a ring-like through hole h14*b* is formed for the cut-out portion R14 so as to penetrate the second surface S13*a* of the packing member 14 and the cut-out portion 14 to facilitate the elastic deformation of the packing member 14.

The cover 15 for sealing packing member is made of metal such as stainless steel and has a shaft hole h15*a* for inserting the rotary shaft 3*b* of the rotary body 4 at the center thereof.

The second surface S15*b* of the cover 15 for sealing packing member is mirror finished, so that the cover 15 for sealing packing member and the cover 11 are airtightly contacted when the cover 11 is attached to the cover 15 for sealing packing member.

Bolt holes h15*b* . . . are formed on the cover 15 for sealing packing member in order to attach the cover 15 for sealing packing member to the cover 11 by means of fixing means 17 . . . .

In this embodiment, the cover 15 for sealing packing member has a concave part for containing packing member (see the concave part C15 for containing packing member in FIG. 3).

As shown in FIG. 3, in this embodiment, the total height of the depth H15 of the concave part C15 for containing packing member provided in the cover 15 for sealing packing member and the depth H11 of the concave part C11 for containing packing member provided in the cover 11 is designed to be the same as or is a little larger than the thickness H13 of the packing member 13 when the cover 15 for sealing packing member is attached to the cover 11.

The cover 16 for sealing packing member is made of metal such as stainless steel.

The second surface S16*b* of the cover 16 for sealing packing member is mirror finished, so that the cover 16 for sealing packing member and the cover 12 are airtightly contacted when the cover 16 for sealing packing member is attached to the cover 12.

Screw holes h16*b* . . . are formed on the cover 16 for sealing packing member in order to attach the cover 16 for sealing packing member to the cover 12 by means of fixing means 18 . . . .

In this embodiment, the cover 16 for sealing packing member has a concave part for containing packing member (see the concave part C16 for containing packing member in FIG. 3).

As shown in FIG. 3, in this embodiment, the total height of the depth H16 of the concave part C16 for containing packing member provided in the cover 16 for sealing packing member and the depth H12 of the concave part C12 for containing packing member provided in the cover 12 is designed to be the same as or is a little larger than the thickness H14 of the packing member 13 when the cover 16 for sealing packing member is attached to the cover 12.

Next, the shape and structure of the rotary body 4 are explained.

The rotary body 4 has a main member 4A of the rotary body and a rotary shaft 3*b* and 3*b* which are provided so as to accord with the center axis of the main member 4A of the rotary body.

The main member 4A of the rotary body, the rotary shaft 3*a* and the rotary shaft 3*b* are made of metal in this embodiment.

The main member 4A of the rotary body is cylinder-shaped, the height H4 is the same as or a little smaller than the height of the tubular hollow space R2 of the main body of pulsating vibration air generation apparatus 2 (more specifically, the main body 2A of the apparatus). The diameter of the main member 4A of rotary body is designed to be the same as or a litter smaller than the diameter of the tubular hollow space R2 of the main body of pulsating vibration air generation apparatus 2 (more specifically, the main body 2A of the apparatus).

The side surface S4*c* of the main member 4A of the rotary body is mirror finished in such a manner that the main member 4A of rotary body is smoothly rotated in the tubular hollow space R2 of the main body of pulsating vibration air generation apparatus 2 (more specifically, the main body 2A of the apparatus) while the side surface S4*c* slides on the inner surface S2*c* forming the tubular hollow space R2 of the main body of pulsating vibration air generation apparatus 2 (more specifically, the main body 2A of the apparatus).

The first surface S4*a* and the second surface S4*b* of the main member 4A of the rotary body are mirror finished in order that the main member 4A of the rotary body is smoothly rotated in the tubular hollow space R2 of the main body of pulsating vibration air generation apparatus 2 (more specifically, the main body 2A of the apparatus).

A communication passage h4 is provided in the rotary body 4 (more specifically the main member 4A of rotary body).

The communication passage h4 is provided such that the ends eh4*a* and eh4*b* thereof come to the position of each one of the air communication ports h2*a* and h2*b* provided in the main body of pulsating vibration air generation apparatus 2 (more specifically, the main body 2A of the apparatus)

respectively when the rotary body 4 is rotatably embraced in the main body of pulsating vibration air generation apparatus 2 (more specifically, the main body 2A of the apparatus).

In this embodiment, the diameter of the communication passage h4 is the same as or is substantially the same as the inner diameter of the pipe T1 and the inner diameter of the pipe T2.

This embodiment uses the rotary shaft 3*b* having a first rotary shaft part 3*b*1 and a second rotary shaft part 3*b*2 of which diameter is a little smaller than that of the first rotary shaft part 3*b*1.

The diameter of the first rotary shaft part 3*b*1 is the same as or a little smaller than the diameter of the shaft hole h11*a* formed in the center of the cover 11 (more specifically, the bottom of the concave portion C11 for containing packing member).

The length of the first rotary shaft part 3*b* l is the same as or is substantially the same as the length of the shaft hole h11*a* formed in the cover 11.

The diameter of the second rotary shaft part 3*b*2 is the same as or a little larger than the diameter of the shaft hole h13*a* formed in the center of the packing member 13.

Therefore, when the second rotary axis part 3*b*2 is inserted into the shaft hole h12*a* of the packing member 13, the packing member 13 is elastically deformed by the second rotary shaft part 3*b*2, which is in turn tighten by the resilience. Thus the second rotary shaft part 3*b*2 is fixedly attached to the packing member 13 at a contact position of the secondary rotary shaft part 3*b*2 and the shaft hole h12*a* of the packing member 13.

This embodiment uses the rotary shaft 3*a* having a first rotary shaft part 3*a*1 and a second rotary shaft part 3*a*2 of which diameter is a little smaller than that of the first rotary shaft 3*a*1.

The diameter of the first rotary shaft part 3*a*1 is the same as or a little smaller than the diameter of the shaft hole h12*a* formed in the center of the cover 12 (more specifically, the bottom of the concave portion C12 for containing packing member).

The length of the first rotary shaft part 3*a*1 is the same as or is substantially the same as the length of the shaft hole h12*a* formed in the cover 12.

The diameter of the second rotary shaft part 3*a*2 is the same as or a little larger than the diameter of the shaft hole h14 formed in the center of the packing member 14.

Therefore, when the second rotary axis part 3*a*2 is inserted into the shaft hole h14 of the packing member 14, the packing member 14 is elastically deformed by the second rotary shaft part 3*a*2, which is in turn tighten by the resilience. Thus the second rotary shaft part 3*a*2 is fixedly attached to the packing member 14 at a contact position of the second rotary shaft part 3*a*2 and the shaft hole h14 of the packing member 14.

Next, the structure procedure of the pulsating vibration air generation apparatus 1 is exemplified.

At first, the cover 12 is attached to the main body 2A of the apparatus.

The rotary body 4 is contained in the main body 2A of the apparatus.

Simultaneously the rotary shaft 3*a* provided in the rotary body 4 is inserted in the shaft hole h12*a* of the cover 12.

The rotary shaft 3*a* (more specifically the second rotary shaft part 3*a*2) projecting out of the cover 12 from the shaft hole h12*a* thereof is inserted in the shaft hole for rotary shaft h14 formed in the center of the packing member 14.

Thus, the packing member 14 is contained in the concave portion C12 for containing packing member provided in the cover 12.

The cover 16 for sealing packing member is attached to the cover 12 in such a manner that the packing member 14 is contained in the concave portion C12 for containing packing member of the cover 12 and in the concave portion C16 for containing packing member of the cover 16 for sealing packing member.

The cover 12 and/or the cover 16 for sealing the packing member are/is rotated against the main body 2A of the apparatus 2A such that all of the screw holes formed on the second surface S2*b* of the main body 2A of the apparatus (see screw holes h2*d* and h2*d* in FIG. 3), the screw holes h12*b* . . . formed on the cover 12, and the screw holes h16*b* . . . formed on the cover 16 for sealing packing member are aligned respectively. Thereafter, the cover 12 and the cover 16 for sealing packing member are screwed on the main body 2A of the apparatus with each one of fixing means 18 . . . , thereby fixing the cover 12 and the cover 16 for sealing packing member to the main body 2A of the apparatus.

Then, the rotary shaft 3*b* provided in the rotary body 4 contained in the main body 2A of the apparatus is inserted into the shaft hole h11*a* of the cover 11, thus the cover 11 is attached to the main body 2A of the apparatus.

The packing member 13 is contained in the concave part C11 for containing packing member of the cover 11 in such a manner that the rotary shaft 3*b* (more specifically the second rotary shaft part 3*b*2) projecting out of the cover 11 via the shaft hole h11*a* thereof is inserted in the shaft hole h13 of the packing member 13.

The cover 15 for sealing packing member is attached to the cover 11 such that the rotary shaft 3*b* (more specifically the second rotary shaft part 3*b*2) projecting out of the cover 11 via the shaft hole 11*a* thereof is inserted into the shaft hole h15*a* of the cover 15 for sealing packing member and the packing member 13 is contained in the concave portion C11 for containing packing member of the cover 11 and in the concave portion C15 for containing packing member of the cover 15 for sealing packing member.

The cover 11 and/or the cover 15 for sealing packing member are/is rotated against the main body 2A of the apparatus such that all of the screw holes h2*c* . . . formed on the first surface S2*a* of the main body 2A of apparatus, the screw holes h11*b* . . . formed on the cover 11, and the screw holes h15*b* . . . formed on the cover 15 for sealing packing member 15 are aligned respectively. Thereafter, the cover 11 and the cover 15 for sealing packing member are screwed on the main body 2A of the apparatus with each one of fixing means 17 . . . , thereby fixing the cover 11 and the cover 15 for sealing packing member to the main body 2A of the apparatus.

Thus, the assembly of the pulsating vibration air generation apparatus 1 is completed.

Next, the operations of the pulsating vibration air generation apparatus 1 are explained.

The pipe T1 is connected to the air communication port h2*a* provided in the main body 2 (more specifically the main body 2A of the apparatus) of the pulsating vibration air generation apparatus 1 and the air connection port h2*b* is connected to the pipe T2 of the pulsating vibration air generation apparatus (see FIG. 4 and FIG. 5).

The rotary drive means such as an electric motor (not shown) is connected to the rotary shaft 3*b* projecting from the main body 2 of the pulsating vibration generation apparatus 1.

The rotary drive means (not shown) is designed to control the rotary drive amount.

At first, the operation in the case for generating a pulsating vibration air of positive pressure is explained.

For generating a pulsating vibration air of positive pressure inside the pipe T2, a compressed air source (not shown) is connected as an air source (not shown) to the pipe T1. As the compressed air source (not shown), used are a gas tank in which gas such as air or nitrogen gas is bottled under pressure, a blower and so on. If a blower is used as the air source (not shown), the discharge port of the blower is connected to the pipe T1.

Then, a compressed gas is supplied to the pipe T1 from the air source (not shown).

The rotary body 4 is driven to be rotated at a fixed rotation speed by driving the rotary drive means (not shown) at a fixed rotation speed in the main body of pulsating vibration air generation apparatus 2.

The rotary body 4 (more specifically, main body 4A of the rotary body) is rotated at a fixed rotation speed in the tubular hollow space R2 of the main body of pulsating vibration air generation apparatus 2 (more specifically, the main body 2A of the apparatus) while the side surface S4*c* of the rotary body 4 is sliding on the inner side circumference S2*c* forming the tubular hollow space R2 of the main body of pulsating vibration air generation apparatus 2.

Figure 6A:
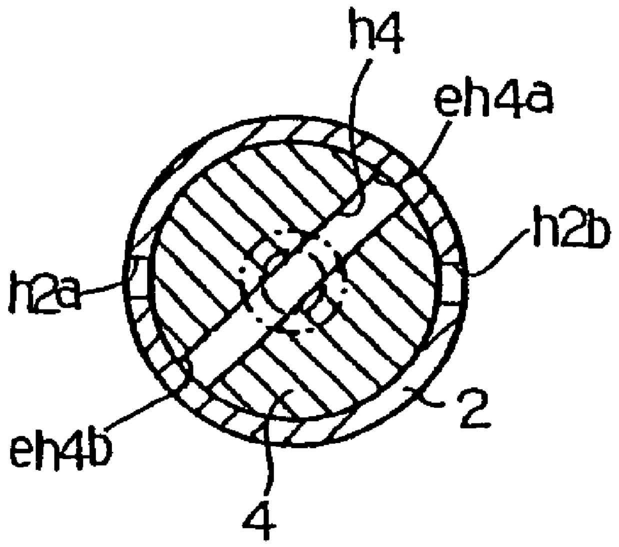
FIG. 6*a* shows that the two air communication ports provided in the main body are intercepted.
Figure 6B:
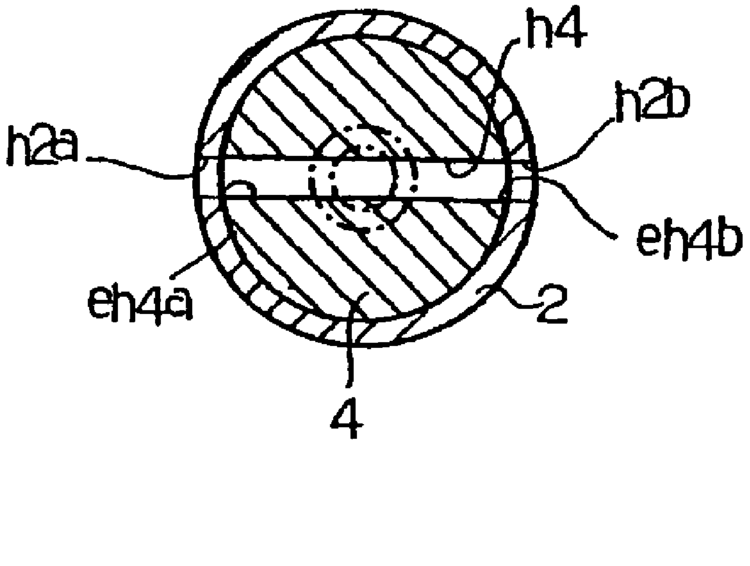
FIG. 6*b* shows that two air communication ports provided in the main body are communicated.

FIG. 6 is an explanatory view diagrammatically showing the phenomena caused in the main body of pulsating vibration air generation apparatus 2. FIG. 6*a* shows that two air communication ports h2*a* and h2*b* provided in the main body 2 are intercepted, and FIG. 6*b* shows that two air communication ports h2*a* and h2*b* provided in the main body are communicated.

When each end eh4*a* and eh4*b* of the communication passage h4 provided in the rotary body 4 does not come to the position which meets each one of the two air communication ports h2*a* and h2*b* of the main body of pulsating vibration air generation apparatus 2 as shown in FIG. 6*a*, the air communication port h2*a* and h2*b* are not communicated, so that the compressed gas supplied from the pipe T1 to the main body 2 is not discharged into the pipe T2.

On the other hand, when each end eh4*a* and eh4*b* of the communication passage h4 provided in the rotary body 4 comes to the position which meets each one of the two air communication ports h2*a* and h2*b* of the main body of pulsating vibration air generation apparatus 2 as shown in FIG. 6*a*, the air communication ports h2*a* and h2*b* are communicated, so that the compressed gas supplied from the pipe T1 to the main body 2 is discharged into the pipe T2.

Further, when each end eh4*a* and eh4*b* of communication passage h4 provided in the rotary body 4 comes to the position which meets each one of the two air communication ports h2*a* and h2*b* of the main body of pulsating vibration air generation apparatus 2 as shown in FIG. 6*b*, the air communication ports h2*a* and h2*b* are communicated, so that the compressed gas supplied from the pipe T1 to the main body of pulsating vibration air generation apparatus 2 is discharged in the pipe T2.

Repeating the above-mentioned operations while driving the pulsating vibration air generation apparatus 1, a pulsating vibration air of positive pressure is generated in the pipe T2.

According to the pulsating vibration air generation apparatus 1, the air communication ports h2*a* and h2*b* are communicated while the rotary body 4 is once rotated in the main body of pulsating vibration air generation apparatus 2 in the following two cases: in the case that the end eh4*a* of the communication passage h4 fits the air communication port h2*a* and simultaneously the end eh4*b* of the communication passage h4 fits the air communication port h2*b*; and in the case that the end eh4*b* of the communication passage h4 fits the air communication port h2*a* and simultaneously the end eh4*a* of the communication passage h4 fits the air communication port h2*b*. Except for the above-mentioned two case, the air communication ports h2*a* and h2*b* are not communicated.

As shown in FIG. 6*a*, the pulsating vibration air generation apparatus 1 is constructed such that the rotary body 4 (more specifically, the main member 4A of the rotary body) slides on the inner side circumference S2*c* forming the tubular hollow space R2 in the main body of pulsating vibration air generation apparatus 2. Therefore, while the air communication ports h2*a* and h2*b* are not communicated, the compressed gas supplied to the main body of pulsating vibration air generation apparatus 2 from the air source (not shown) via the pipe T1 is not discharged into the pipe T2.

Only when the air communication ports h2*a* and h2*b* are communicated by the communication passage h4, the compressed gas supplied to the main body of pulsating vibration air generation apparatus 2 from the air source (not shown) via the pipe T1 is discharged into the pipe T2.

As the result, a pulsating vibration air of positive pressure sharply and quickly controlled in turning on and off operation at a fixed frequency of which peak and valley are hardly attenuated can be generated in the pipe T2 with the pulsating vibration air generation apparatus 1.

Figure 17:
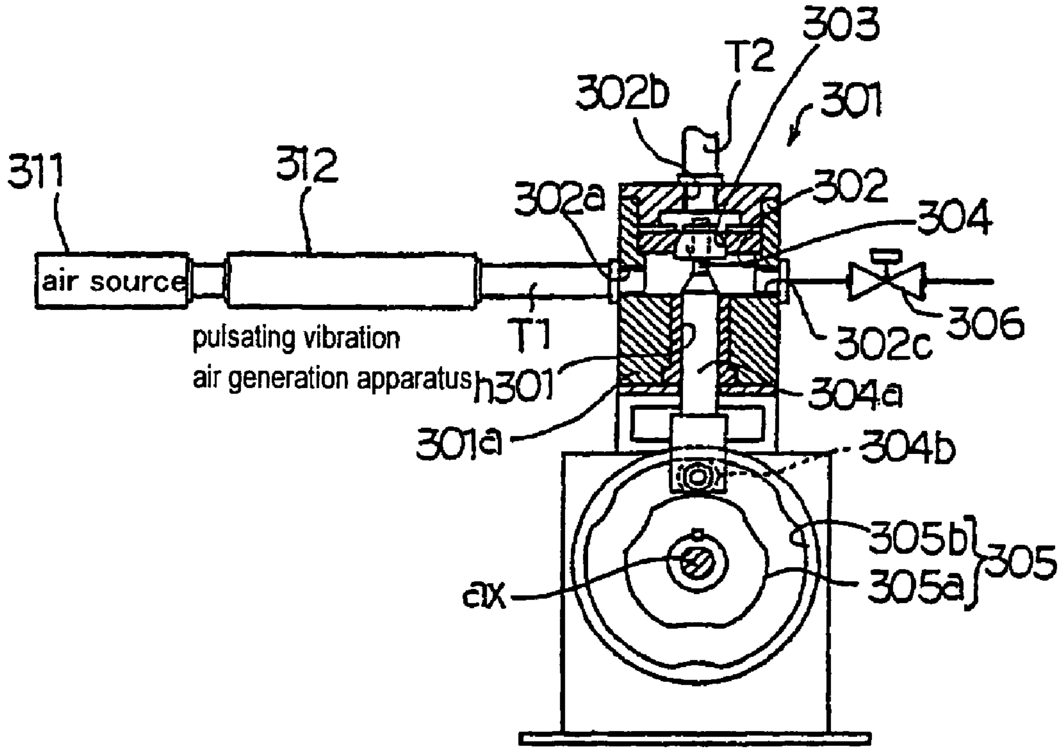
FIG. 17 is an explanatory view showing other embodiment of a pulsating vibration air generation apparatus that has been already proposed by the inventors of the present invention.

In the pulsating vibration air generation apparatus 1, the rotary body 4 is rotated in the tubular hollow space R2 in the main body of pulsating vibration air generation apparatus 2. Unlike the pulsating vibration air generation apparatus 301 in FIG. 17 in which a pulsating vibration air is generated by opening and closing the valve seat 303 by moving the valve 304 up and down by the rotary cam mechanism, remarkable vibration thus caused by opening and closing operations of the valve 304 is not generated in the present pulsating vibration air generation apparatus 1.

Further, according to the pulsating vibration air generation apparatus 1, the packing member 13 is provided in order to prevent air leak between the rotary shaft 3*b* (more specifically the first rotary shaft part 3*b*1) and the shaft hole h11*a* formed in the cover 11. Therefore, the compressed gas does not leak out of the cover 11 from the gap therebetween.

In addition, the cover 11 is airtightly covered with the cover 15 for sealing packing member interposing the packing member 13, so that the compressed gas does not leak out of the cover 15 for sealing packing member from the gap between the through hole h15*a* in the cover 15 for sealing packing member and the rotary shaft 3*b* (more specifically the second rotary shaft part 3*b*2).

Still further, according to the pulsating vibration air generation apparatus 1, the sealing packing member 14 is provided in order to prevent air leak between the rotary shaft 3*a* (more specifically the first rotary shaft part 3*a*1) and the shaft hole h12*a* formed in the cover 12. Therefore, the compressed gas does not leak out of the cover 12 from the gap therebetween.

In addition, the cover 12 is airtightly covered with the cover 16 for sealing packing member interposing the packing member 14, so that the compressed gas does not leak out of the cover 16 for sealing packing member.

According to the above-mentioned pulsating vibration air generation apparatus 1, the compressed gas supplied from the main body of pulsating vibration air generation apparatus 2 through the pipe T1 from the air source (compressed air source, not shown) is efficiently converted into a pulsating vibration air of positive pressure by the pulsating vibration air generation apparatus 1 to generate the pulsating vibration air of positive pressure inside the pipe T2.

Next, the operation in the case for generating a pulsating vibration air of negative pressure is explained.

For generating a pulsating vibration air of negative pressure inside the pipe T2, an inhaling air source (not shown) is connected as an air source (not shown) to the pipe T1. As the inhaling air source (not shown), used are a vacuum pump, a blower and so on. If a blower is used as the air source (not shown), the inhaling port of the blower is connected to the pipe T1.

Then, the air source (not shown) is driven to generate a inhaled gas directing from the main body of pulsating vibration air generation apparatus 2 to the air source (not shown) in the pipe T1.

The rotary body 4 is rotated at a fixed rotation speed by rotating the rotary drive means (not shown) at a fixed rotation speed in the main body of pulsating vibration air generation apparatus 2.

The rotary body (more specifically, main member 4A of the rotary body) 4 is rotated at a fixed rotation speed in the tubular hollow space R2 in the main body of pulsating vibration air generation apparatus 2 (more specifically, the main body 2A of the apparatus) while the side surface S4*c* of the rotary body 4 slides on the inner side surface S2*c* forming the tubular hollow space R2 of the main body 2.

When each end eh4*a* and eh4*b* of the communication passage h4 provided in the rotary body 4 does not come to the position which meets each one of the two air communication ports h2*a* and h2*b* of the main body of pulsating vibration air generation apparatus 2 as shown in FIG. 6*a*, the air communication ports h2*a* and h2*b* are not communicated, so that an inhaled air flow (negative pressure) directing to the main body 2 is not generated in the pipe T2.

On the other hand, when each end eh4*a* and eh4*b* of the communication passage h4 provided in the rotary body 4 comes to the position which meets each one of the two air communication ports h2*a* and h2*b* of the main body of pulsating vibration air generation apparatus 2 as shown in FIG. 6*b*, the air communication holes h2*a* and h2*b* are communicated, so that an inhaled air flow (negative pressure) directing to the main body 2 from the pipe T2 is generated in the pipe T2.

Further, when each end eh4*a* and eh4*b* of the communication passage h4 provided in the rotary body 4 comes to the position which meets each one of the two air communication ports h2*a* and h2*b* of the main body of pulsating vibration air generation apparatus 2 as shown in FIG. 6*b*, the air communication ports h2*a* and h2*b* are not communicated, so that a suction mode air flow (negative pressure) directing to the main body 2 from the pipe T2 is generated in the pipe T2.

Repeating the above-mentioned operations while driving the pulsating vibration air generation apparatus 1, a pulsating vibration air of negative pressure is generated in the pipe T2.

According to the pulsating vibration air generation apparatus 1, the air communication ports h2*a* and h2*b* are communicated while the rotary body 4 is once rotated in the main body of pulsating vibration air generation apparatus in the following two cases: in the case that the end eh4*a* of the communication passage h4 fits the air communication port h2*a* and simultaneously the end eh4*b* of the communication passage h4 fits the air communication port h2*b*; and in the case that the end eh4*b* of the communication passage h4 fits the air communication port h2*a* and simultaneously the end eh4*a* of the communication passage h4 fits the air communication port h2*b*. Except for the above tow cases, the air communication ports h2*a* and h2*b* are not communicated.

As shown in FIG. 6*a*, the pulsating vibration air generation apparatus 1 is constructed such that the rotary body 4 (more specifically, the main member 4A of the rotary body) slides on the inner side circumference S2*c* forming the tubular hollow space R2 in the main body of pulsating vibration air generation apparatus 2. Therefore, while the air communication ports h2*a* and h2*b* are not communicated, an inhaled air flow (negative pressure) directing to the main body 2 from the pipe T2 is not generated in the pipe T2.

Only when the air communication holes h2*a* and h2*b* are communicated by the communication passage h4, an inhaled air flow (negative pressure) directing to the main body of pulsating vibration air generation apparatus 2 from the pipe T2 is generated in the pipe T2 with the pulsating vibration air generation apparatus 1.

As the result, a pulsating vibration air of negative pressure sharply and quickly controlled in turning on and off operation at a fixed frequency with sharp and hardly attenuated peak and valley can be generated in the pipe T2 with the pulsating vibration air generation apparatus 1.

In the pulsating vibration air generation apparatus 1, the rotary body 4 is rotated in the tubular hollow space R2 in the main body of pulsating vibration air generation apparatus 2. Unlike the pulsating vibration air generation apparatus 301 in FIG. 17 in which a pulsating vibration air is generated by opening and closing the valve seat 303 by moving the valve 304 up and down by the rotary cam mechanism, remarkable vibration caused by such open and close operations of the valve 304 is not generated in the present pulsating vibration air generation apparatus 1.

Further, according to the pulsating vibration air generation apparatus 1, the packing member 13 is provided in order to prevent air leak between the rotary shaft 3*b* (more specifically the first rotary shaft part 3*b*1) and the shaft hole h11*a* formed in the cover 11. Therefore, the atmospheric air does not enter in the cover 11 from the gap therebetween.

In addition, the cover 11 is airtightly covered with the cover 15 for sealing packing member interposing the packing member 13, so that the atmospheric air does not come into the cover 15 for sealing packing member from the gap between the shaft hole h15*a* formed in the cover 15 for sealing packing member and the rotary shaft 3*b* (more specifically the second rotary shaft part 3*b*2).

Still further, according to the pulsating vibration air generation apparatus 1, the packing member 14 is provided in order to prevent air intrusion between the rotary shaft 3*a* (more specifically the first rotary shaft part 3*a*1) and the shaft hole h12*a* formed in the cover 12. Therefore, the atmospheric air does not come into the cover 12 from the gap therebetween.

In addition, the cover 12 is airtightly covered with the cover 16 for sealing packing member interposing the packing member 14, so that the atmospheric air does not come into the cover 16 for sealing packing member.

According to the above-mentioned pulsating vibration air generation apparatus 1, an inhaled air flow (negative pressure) directing from the main body of pulsating vibration air generation apparatus 2 to the air source (inhaling air source) in the pipe T1 is efficiently converted into a pulsating vibration air of negative pressure by the pulsating vibration air generation apparatus 1 to generate a pulsating vibration air of negative pressure inside the pipe T2.

In the above-mentioned explanation, according to the pulsating vibration air generation apparatus 1, the air communication ports h2*a* and h2*b* are formed on the center line of the tubular hollow space R2 of the main body of pulsating vibration air generation apparatus 2 (more specifically the main body 2A of the apparatus). Further, the communication passage h4 is designed to be on the center line of the rotary body (more specifically the main member 4A of the rotary body) at the same position in which the air communication port h2*a* and h2*b* are provided in the main body of pulsating vibration air generation apparatus 2 (more specifically the main body 2A of the apparatus) when the rotary body 4 (more specifically the main member 4A of the rotary body) is embraced in the main body 2 (more specifically the main body 2A of the apparatus) in such a manner that the communication passage h4 is capable of aligning with the air communication ports h2*a* and h2*b* provided in the tubular hollow space R2 in the main body 2 (more specifically the main body 2A). However, the pulsating vibration air generation apparatus 1 is one example to explain the pulsating vibration air generation apparatus of the present invention. Therefore, the pulsating vibration air generation apparatus of the present invention is not limited to the pulsating vibration air generation apparatus 1.

Figure 7A:
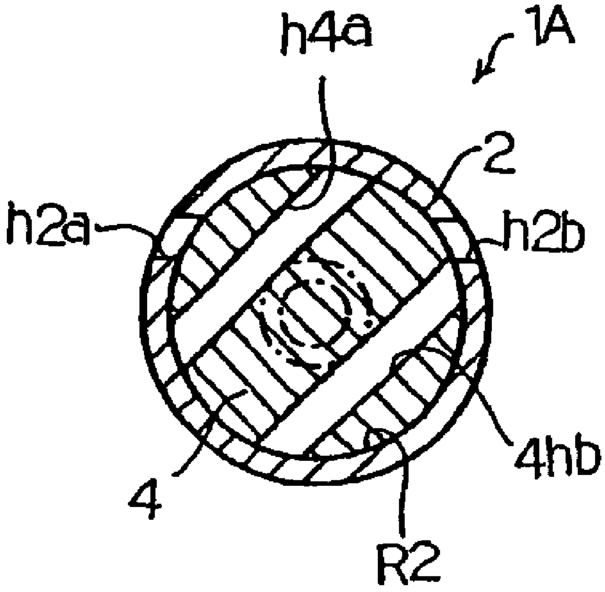
FIG. 7*a* is an explanatory view diagrammatically showing two air communication ports formed on a tubular hollow space of a main body of pulsating vibration air generation apparatus are intercepted.
Figure 7B:
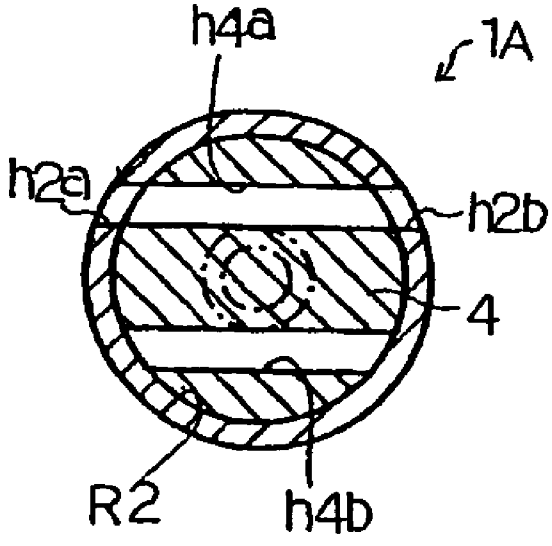
FIG. 7*b* is an explanatory view diagrammatically showing the two air communication ports formed on the tubular hollow space of the main body of pulsating vibration air generation apparatus are communicated.

FIG. 7 is an explanatory view showing other embodiment of a pulsating vibration air generation apparatus according to the present invention. FIG. 7*a* is an explanatory view diagrammatically showing two air communication ports h2*a* and h2*b* formed on the tubular hollow space R2 of the main body of pulsating vibration air generation apparatus 2 (more specifically the main body 2A of the apparatus) are intercepted, and FIG. 7*b* is an explanatory view diagrammatically showing two air communication ports h2*a* and h2*b* formed on the tubular hollow space R2 of the main body of pulsating vibration air generation apparatus 2 (more specifically the main body 2A of the apparatus) are communicated.

According to the pulsating vibration air generation apparatus of the present invention, similar to the pulsating vibration air generation apparatus 1A shown in FIG. 7*a* and FIG. 7*b*, the air communication ports h2*a* and h2*b* are provided out of alignment with the center line of the tubular hollow space R2 of the main body of pulsating vibration air generation apparatus 2 (more specifically the main body 2A of the apparatus). Further, when the rotary body 4 is embraced in the main body of pulsating vibration air generation apparatus 2 (more specifically the main body of apparatus 2A) such that the communication passage h4 is capable of aligning with the air communication ports h2*a* and h2*b* provided in the tubular hollow space R2 in the main body 2 (more specifically the main body 2A of the apparatus), the communication passages h4*a* and/or h4*b* are/is designed to be out of alignment with the center line of the rotary body (more specifically the main member 4A of the rotary body) at the same position on which the air communication ports h2*a* and h2*b* are provided in the main body 2 (more specifically the main body 2A of the apparatus).

As shown in FIG. 7*a* and FIG. 7*b*, when two communication passages h4*a* and h4*b* are provided in the rotary body 4, the pulsating vibration air generation apparatus in which the air communication ports h2*a* and h2*b* are communicated twice while the rotary body 4 is rotated in the main body of pulsating vibration air generation apparatus 2 (more specifically the main body 2A of the apparatus) at once is achieved.

If only one of communication passages h4*a* and h4*b* is provided in the rotary body 4, the pulsating vibration air generation apparatus in which the air communication ports h2*a* and h2*b* are communicated once while the rotary body 4 is rotated in the main body of pulsating vibration air generation apparatus 2 (more specifically the main body 2A of the apparatus) at once is achieved.

Other structure of the pulsating vibration air generation apparatus 1A is the same as that of the pulsating vibration air generation apparatus 1, so that their explanations are omitted here.

Figure 8:
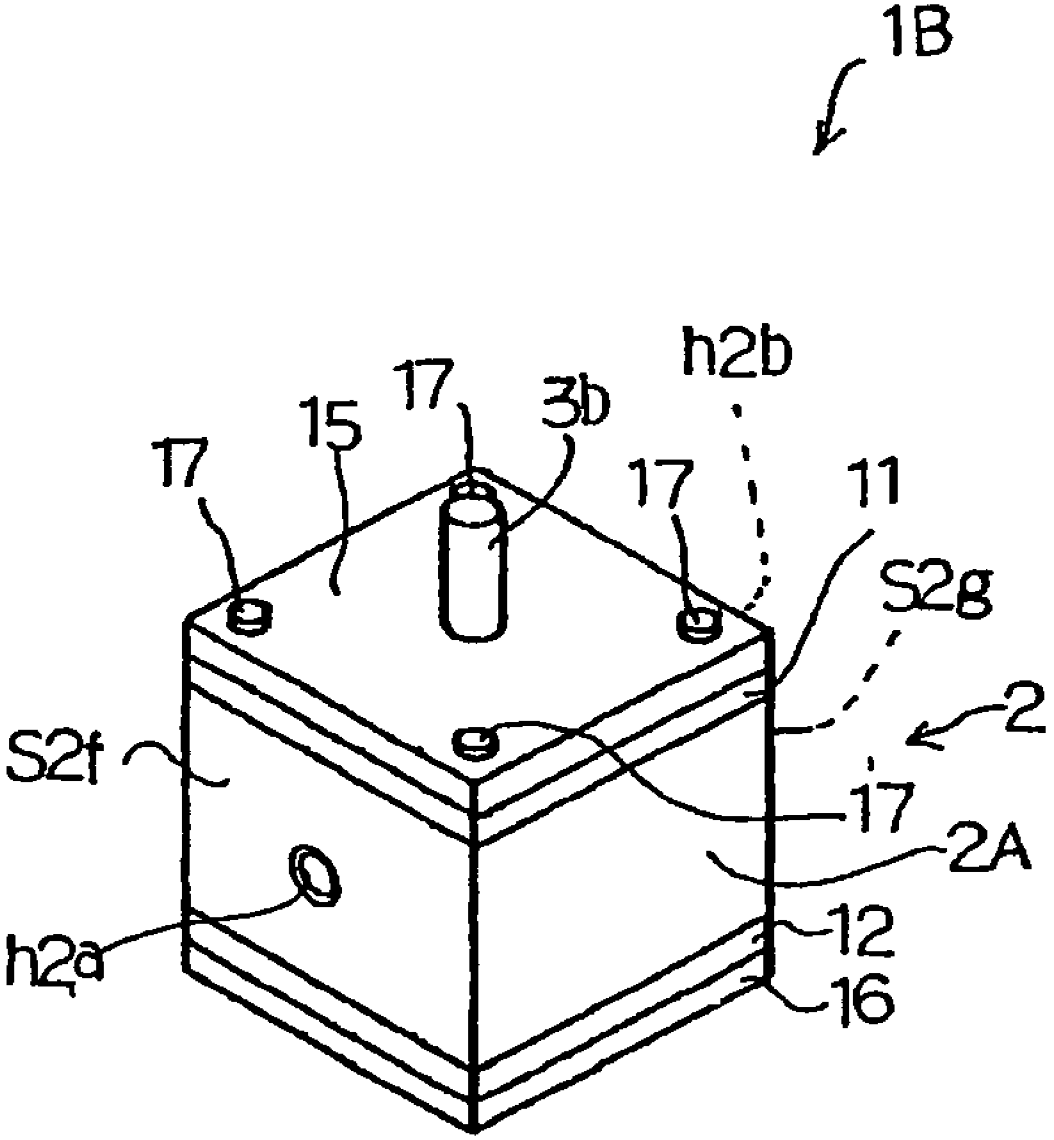
FIG. 8 is an explanatory view showing other embodiment of a pulsating vibration air generation apparatus according to the present invention and is a perspective view of an appearance diagrammatically explaining the condition before a pipe is connected to the pulsating vibration air generation apparatus.
Figure 9:
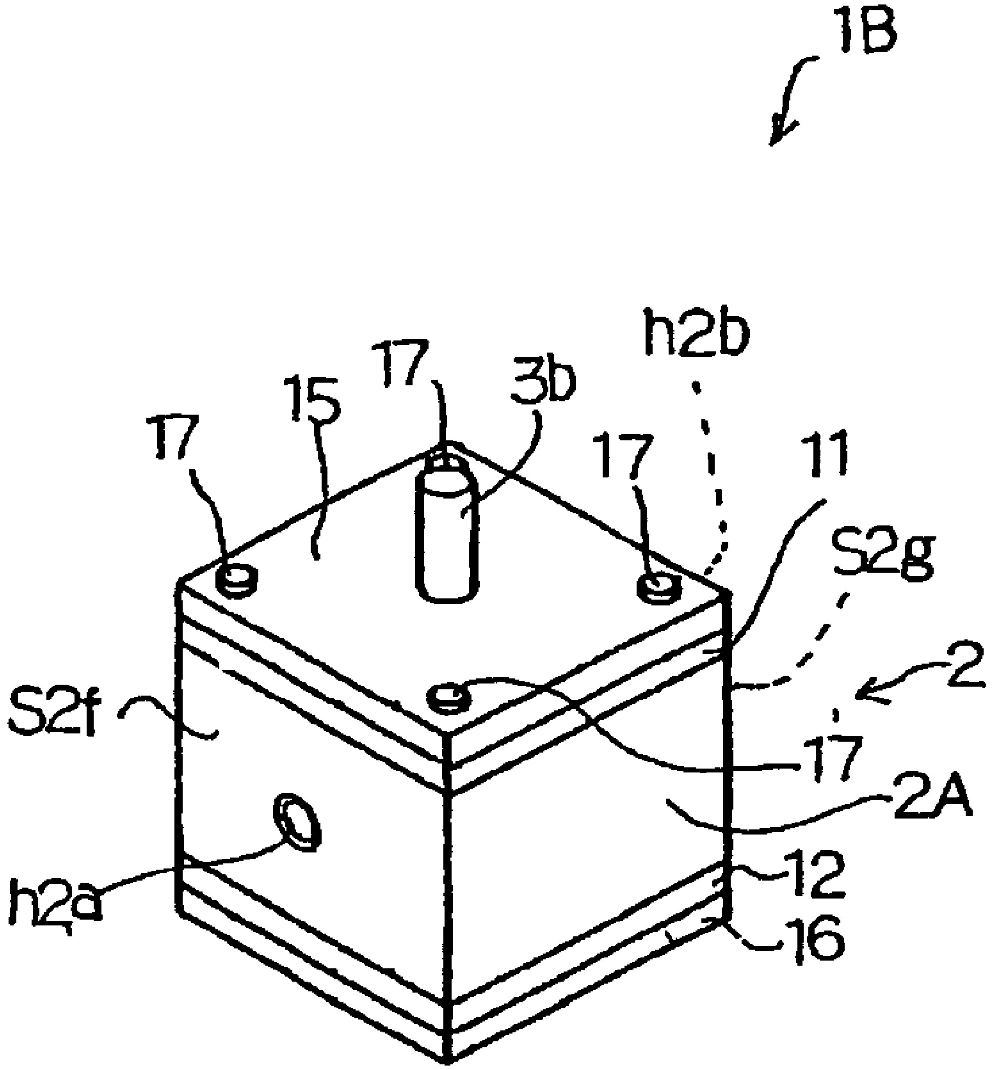
FIG. 9 is a perspective view of an appearance diagrammatically explaining the condition after the pipe is connected to the pulsating vibration air generation apparatus shown in FIG. 8.

FIG. 8 and FIG. 9 are explanatory views showing other embodiment of a pulsating vibration air generation apparatus according to the present invention. FIG. 8 is a perspective view of an appearance diagrammatically explaining the condition before a pipe is connected to the pulsating vibration air generation apparatus. FIG. 9 is a perspective view of an appearance diagrammatically explaining the condition after the pipe is connected to the pulsating vibration air generation apparatus shown in FIG. 8.

The pulsating vibration air generation apparatus 1B has the same structure with the pulsating vibration air generation apparatus 1 other than that the appearance of the main body of pulsating vibration air generation apparatus 2 is different from that of the pulsating vibration air generation apparatus 1. Therefore, the members corresponding to those of the pulsating vibration air generation apparatus 1 have the same reference numerals to eliminate their explanation.

According to the pulsating vibration air generation apparatus 1B, the surfaces S2*f* and S2*g* on which the air communication ports h2*a* and h2*b* of the main body of pulsating vibration air generation apparatus 2 (more specifically the main body 2A of the apparatus) are provided are flat.

In this embodiment, although the shape of the main body of pulsating vibration air generation apparatus 2 (more specifically the main body 2A of the apparatus) is cubic, the shape may be rectangular or other shape as far as the surfaces S2*f* and S2*g* on which the air communication ports h2*a* and h2*b* of the main body 2 (more specifically the main body 2A of the apparatus) are provided are flat.

In the pulsating vibration air generation apparatus 1B, the surfaces S2*f* and S2*g* on which the air communication ports h2*a* and h2*b* of the main body of pulsating vibration air generation apparatus 2 (more specifically the main body 2A of the apparatus) are provided are flat. When the pipe T1 is connected to the air communication port h2*a* of the main body of pulsating vibration air generation apparatus 2 (more specifically the main body 2A of the apparatus), there causes no gap between the end of the pipe T1 and the surface S2*f*. Further, when the pipe T2 is connected to the air communication port h2*b* of the main body of pulsating vibration air generation apparatus 2 (more specifically the main body 2A of the apparatus), there causes no gap between the end of the pipe T2 and the surface S2*g*.

Thus, according to the pulsating vibration air generation apparatus 1B, any gap is not formed between the end of the pipe T1 and the surface S2*f* and between the end of the pipe T2 and the surface S2*g*, therefore, dust and so on are hardly adhered on the connection of the pipe T1 and the surface S2*f* and the connection of the end of the pipe T2 and the surface S2*g*, so that the pulsating vibration air generation apparatus 1B and the clean room and other rooms in which the pulsating vibration air generation apparatus 1B is provided is not hardly contaminated with dust.

As mentioned above, the pulsating vibration air generation apparatus according to the present invention has a specific effect such that it can generate a pulsating vibration air sharply and quickly controlled in turning on and off operation at a fixed frequency with sharp and hardly attenuated peak and valley , and further does not cause any remarkable vibration thereof.

Further, the pulsating vibration air generation apparatus of the present invention can convert the compressed gas or a inhaled air flow (negative pressure) generated by driving an air source is effectively converted into a pulsating vibration air of positive pressure or negative pressure.

Now, preferable usages of the pulsating vibration air generation apparatus according to the present invention are exemplified.

Figure 10:
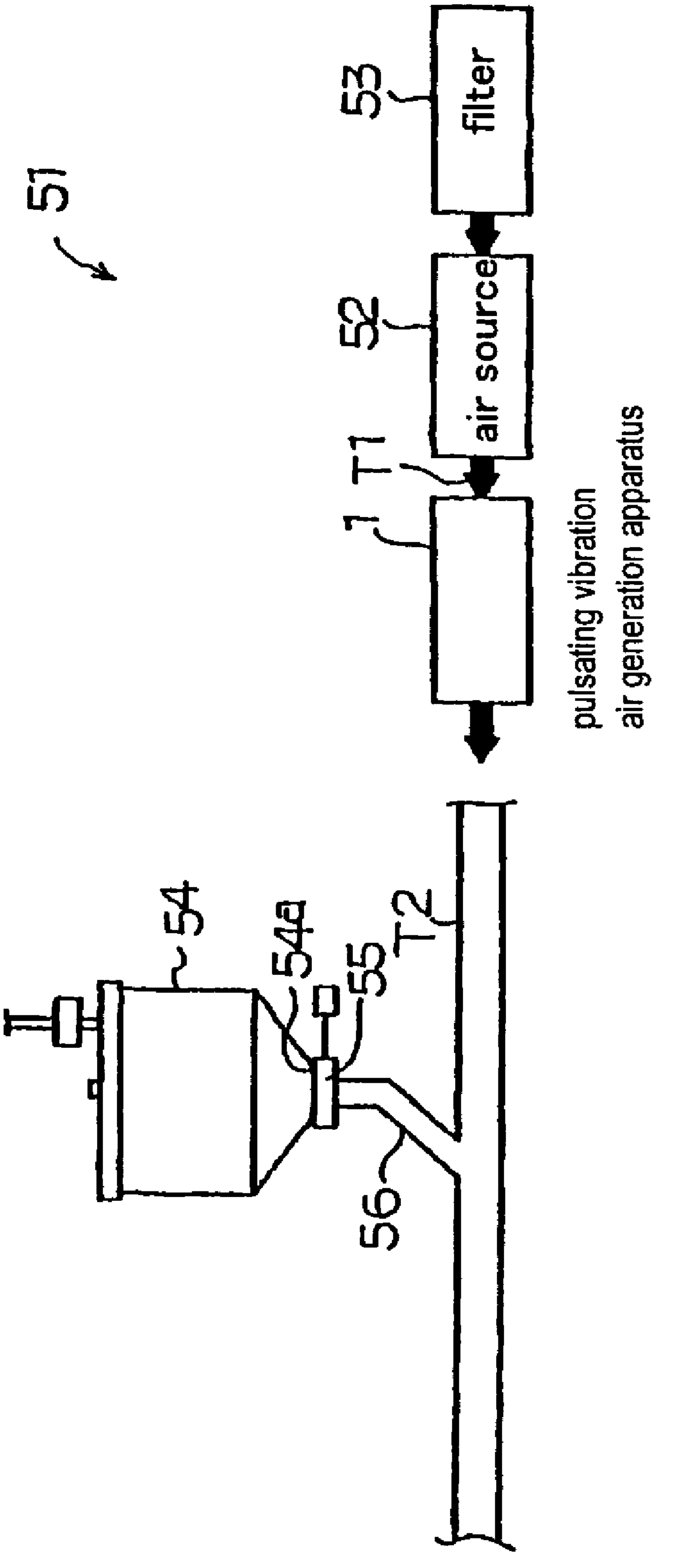
FIG. 10 is a structure view diagrammatically explaining a pneumatic transportation apparatus using a pulsating vibration air generation apparatus according to the present invention.

FIG. 10 is a structure view diagrammatically explaining a pneumatic transportation apparatus using the pulsating vibration air generation apparatus 1 according to the present invention.

The pneumatic transportation apparatus 51 has an air source 52, a filter 53, the pulsating vibration air generation apparatus 1, a pneumatic transport pipe (piping) T2, a pipe T1 for connecting the air source 52 and the pulsating vibration air generation apparatus 1, and a material storage hopper 54 connected in midstream of the pneumatic transport pipe (piping) T2.

One end of the pneumatic transport pipe T2 is connected to the air communication port of the pulsating vibration air generation apparatus 1 (see the air communication port h2*b* in FIG. 5). And the other end (not shown) of the pneumatic transport pipe T2 is connected to the place to which the powder material put in the material storage hopper 54 is to be transported.

In the pneumatic transportation apparatus 51, a blower is used as the air source 52.

One end of the pipe T1 is connected to the air communication port of the pulsating vibration air generation apparatus 1 (see the air communication hole h2*a* in FIG. 5) and the other end is connected to the discharge port of the air source (blower) 52.

The air filter 53 is provided in removing the dust in the air and is provided in the inhaling side of the air source (blower) 52 in this embodiment.

A material feed valve 55 is provided in a material discharge port 54*a* of the material storage hopper 54, so that by opening the material feed valve 55, the material is fed to the pneumatic transport pipe (piping) T2 via a material feed pipe 56 connecting the material storage hopper 54 and the pneumatic transport pipe. (piping) T2.

Next exemplified is the pneumatic transporting method with the pneumatic transportation apparatus 51 in which the powder material stored in the material storage hopper 54 is transported to the destination via the transport pipe (piping) T2.

In this case, the powder material to be pneumatically transported to the destination is stored in the material storage hopper 54.

Then, the air source (blower) 52 is driven at a fixed drive amount.

The rotary drive means (not shown) connected to the rotary shaft 3*b* of the pulsating vibration air generation apparatus 1 is driven to be rotated at a fixed drive amount.

By this operation, a predetermined pulsating vibration air of positive pressure is generated in the pneumatic transport pipe (piping) T2.

The material feed valve 55 repeats opening and closing operations for a fixed time with a specific interval.

While the material feed valve 55 is opened, a fixed amount of powder material stored in the material storage hopper 54 is fed in the pneumatic transport pipe (piping) T2 via the material feed pipe 56, and thus supplied powder material is mixed and dispersed with the pulsating vibration air of positive pressure, which is sequentially transported from one end to the other end of the pneumatic transport pipe (piping) T2, which is further pneumatically transported to the other end of the pneumatic transport pipe (piping) T2.

The frequency of the pulsating vibration air of positive pressure used for the above-mentioned pneumatic transportation varies depending on the property of the powder material stored in the material storage hopper 54, and it is difficult to determine it as a whole. However, the frequency less than 10 Hz should be applied in general.

The pulsating vibration air of positive pressure generated by the pulsating vibration air generation apparatus according to the present invention is hardly attenuated because the pulsating vibration air of positive pressure is generated by means of the pulsating vibration air generation apparatus 1 in the pneumatic transportation apparatus 51.

Therefore, in particular, if the transport pipe (piping) T2 of the pneumatic transportation apparatus 51 is long, accumulation and blow hole phenomena are not caused in the transport pipe (piping) T2.

Accordingly, even when the transport pipe (piping) T2 of the pneumatic transportation apparatus 51 is long, a fixed amount of powder material discharged from the material storage hopper 54 can be transported to its destination without reducing the amount.

Further according to the pneumatic transportation apparatus 51, while the pulsating vibration air of positive pressure is generated, the pulsating vibration air generation apparatus 1 itself does not cause any vibration, so that the pneumatic transport pipe (piping) T2 connected to the pulsating vibration air generation apparatus 1 is scarcely vibrated.

In the pneumatic transportation apparatus 51, even when a powder material is pneumatically transported for a long time, the connected parts of the members of the pneumatic transportation apparatus 51 are not loosened, staggered, or removed.

Figure 11:
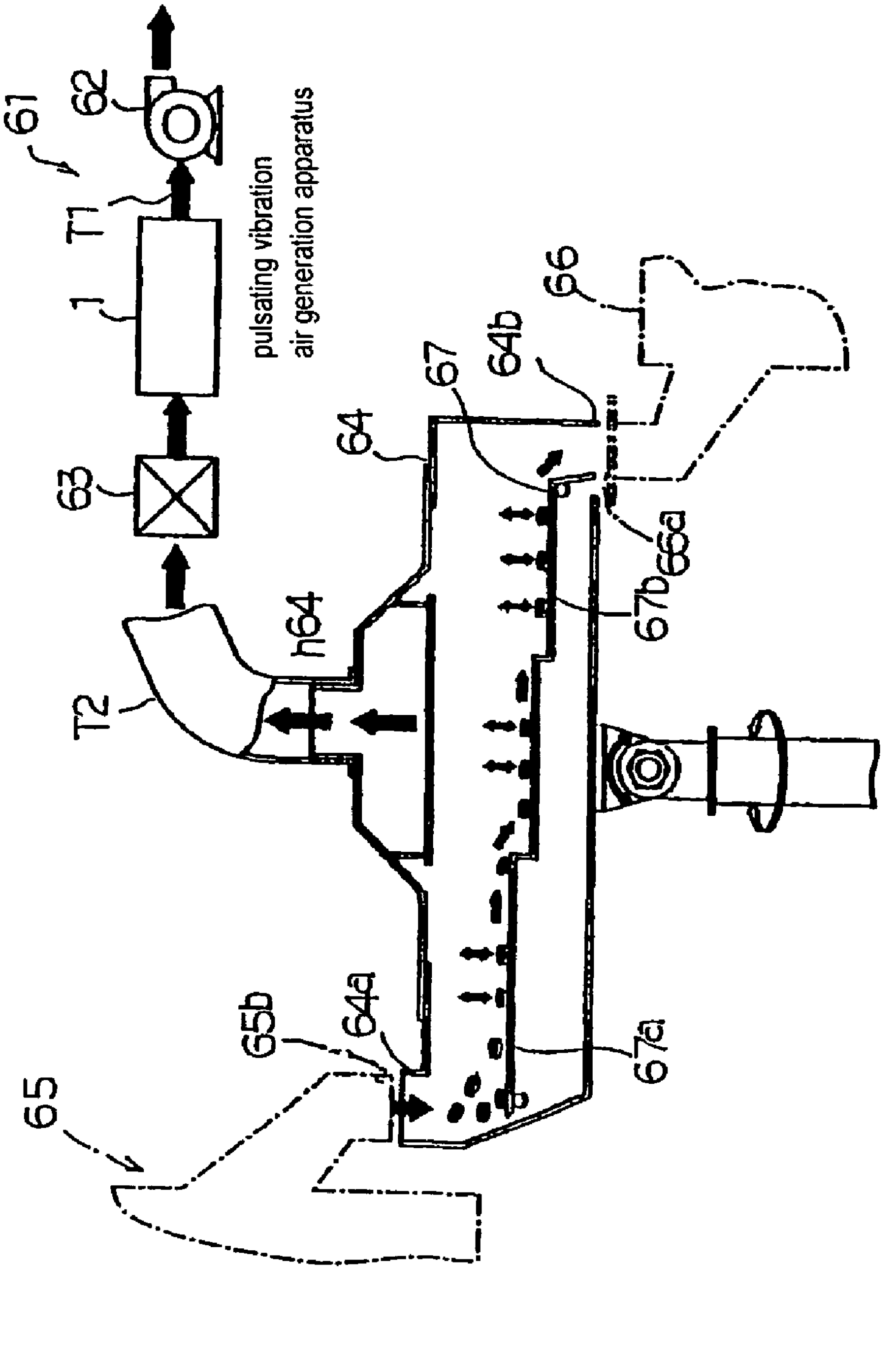
FIG. 11 is a structure view diagrammatically explaining a powder removing apparatus using a pulsating vibration air generation apparatus according to the present invention.

FIG. 11 is a structure view diagrammatically explaining a powder removing apparatus using the pulsating vibration air generation apparatus 1 according to the present invention.

The powder removing apparatus 61 has an air source 62, a filter 63, the pulsating vibration air generation apparatus 1, a main body of powder removing apparatus 64, a pipe T2 connecting the main body of powder removing apparatus 64 and the pulsating vibration air generation apparatus 1, a pipe T1 connecting the air source 62 and the pulsating vibration air generation apparatus 1, a supply apparatus 65 for supplying the material to be removed the powder thereon, and a storage tank 66 for storing the material of which powder is removed.

In this powder removing apparatus 61, a blower is used as the air source 52.

One end of the pipe T1 is connected to an air communication port of the pulsating vibration air generation apparatus 1 (see the air communication port h2*a* in FIG. 5) and the other end thereof is connected to an inhaling port of the air source (blower) 52.

The filter 63 is provided in preventing the powder which is removed from the material from dispersing in the atmosphere and is connected in midstream of the pipe T2.

On end of the pneumatic pipe (piping) T2 is connected to an air communication port of the pulsating vibration air generation apparatus 1 (see the air communication port h2*b* in FIG. 5), and the other end thereof (not shown) is connected to an inhaling port h64 provided in the upper part of the main body of powder removing apparatus 64.

The main body of powder removing apparatus 64 has a material supply port 64*a* from which the material to be removed the powder thereof is supplied and a material discharge port 64*b* for discharging the material of which powder is removed.

The material supply port h64*a* is provided in the upper part of one end of the main body of powder removing apparatus 64, and the material discharge port 64*b* is provided in the lower part of the other end of the main body of powder removing apparatus 64.

The material supply port h64*a* is provided under the material discharge port 65*b* for discharging the material of which powder is to be removed of the supply apparatus 65 for supplying the material to be removed the powder thereof.

The material discharge port h64*b* is provided above a material supply port 66*a* of the storage tank 66 for storing the material of which powder is removed.

Concavo-convex surface 67 is provided in the main body of powder removing apparatus 64 in a manner that a convex part with a fixed width and a concave part with a fixed width are alternately formed.

The pitch dimension of the concave part of the concavo-convex surface 67 is smaller than the diameter of the material to be removed the powder thereof which is supplied on the concavo-convex surface 67.

The concavo-convex surface 67 is formed stepwise from the position under the material supply port 64*a* provided at the upper part of the one end of the main body of powder removing apparatus 65 and to the position above the material discharge port 64*b* provided at the lower part of the other end of the apparatus 64 for supplying the material to be removed the powder thereof.

More specifically, the concavo-convex surface 67 is formed from the highest step 67*a* under the material supply port 64*a* provided at the upper part of one end of the main body of powder removing apparatus 65 to the lowest step 67*b* provided above the material discharge port provided at the other end of the supply apparatus 64 for supplying the material to be removed the powder thereof so as to go down stepwise.

The method for removing powder attached on the material surface from the surface of the powder material stored in the supply apparatus 65 for supplying the material to be removed the powder thereof by means of the powder removing apparatus 61 is exemplified.

At first, the material to be removed the powder thereof (for example, tablets) is stored in the supply apparatus 65 for supplying the material to be removed the powder thereof.

Then the air source (blower) 62 is driven at a fixed drive amount.

Simultaneously the rotary drive means (not shown) connected to the rotary shaft 3*b* of the pulsating vibration air generation apparatus 1 is rotated at a fixed drive amount.

Thus a pulsating vibration air of negative pressure directing from the main body of powder removing apparatus 64 to the pulsating vibration air generation apparatus 1 is generated in the pneumatic transport pipe (piping) T2.

The pulsating vibration air of negative pressure directing to the air inhaling port h64 is also generated in the main body of powder removing apparatus 64.

Then the material (for example tablets) with the powder to be removed thereof which is stored in the material supply apparatus 65 is supplied to the material supply port 64*a* of the main body of powder removing apparatus 64 from the material supply port 64*a* of the material supply apparatus 65.

The material (for example tablets) with the powder to be removed thereof which is thus supplied in the main body of powder removing apparatus 64 from the material supply port 64*a* falls at the highest step 67*a* of the concavo-convex surface 67.

The material (for example tablets) thus fallen on the highest step 67*a* of the concavo-convex surface 67 is inhaled strongly and weakly by the pulsating vibration air of negative pressure generated in the main body of powder removing apparatus 64, so that the powder is removed from the surface of the material with the powder to be removed thereof.

The powder removed from the surface of the material (for example tablets) with the powder to be removed thereon is mixed and dispersed with a pulsating vibration air of negative pressure to be inhaled into the pipe T2.

The powder removed from the surface of the material (for example tablets) inhaled in the pipe T2 is removed by the filter 63 provided in midstream of the pipe T2.

The material (for example tablets) with the powder to be removed thereof which falls on the highest step 67*a* of the concavo-convex surface 67 moves from the highest step 67*a* to the lowest step 67*b* while the powder adhered on the material (for example tablets) is removed by being inhaled strongly and weakly by the pulsating vibration air of negative pressure generated in the main body of powder removing apparatus 64. Then the material (tablets) from which surface powder adhered is removed is sequentially discharged from the material discharge port 64*b* provided at the lower part of the other end of the supply apparatus 65 for supplying the material to be removed the powder thereof into the material supply port 66*a* of the storage tank 66. Thus the material (for example tablets) from which powder adhered thereon is removed is sequentially stored in the storage tank 66.

According to this powder removing apparatus 61, a pulsating vibration air of negative pressure is generated with the pulsating vibration air generation apparatus 1, so that the pulsating vibration air of negative pressure generated by the pulsating vibration air generation apparatus of the present invention is hardly attenuated.

Therefore, according to the powder removing apparatus 61, the material (for example tablets) with the adhered powder to be thereon which is supplied on the concavo-convex surface 67 of the main body of powder removing apparatus 64 is strongly and weakly inhaled by means of the pulsating vibration air of negative pressure generated in the main body of the powder removing apparatus 64, so that the powder adhered on the surface of the material (for example tablets) is completely removed.

Further, the material (for example tablets) with the adhered powder to be removed thereof which is supplied on the concavo-convex surface 67 of the main body of the powder removing apparatus 64 is strongly and weakly inhaled by means of the pulsating vibration air of negative pressure generated in the main body of powder removing apparatus 64, so that the material (for example tablets) with the powder to be removed thereof fallen on the highest step 67*a* of the concavo-convex surface 67 moves into the lowest step 67*b* of the concavo-convex surface 67 without staying in its midstream, thereby sequentially stored in the storage tank 66.

Thus, with the powder removing apparatus 61, powder-removing operation of the material (for example tablets) with the powder to be removed thereof is efficiently executed.

Further, according to the powder removing apparatus 61, while the pulsating vibration air of negative pressure is generated, the pulsating vibration air generation apparatus 1 itself does not cause vibration, so that the pneumatic transport pipe (piping) T2 connected to the pulsating vibration air generation apparatus 1 is scarcely vibrated.

In the powder removing apparatus 61, even when powder-removing operation is executed for a long time, the connected parts of the members of the powder removing apparatus 61 are not loosened, staggered, or removed.

Figure 12:
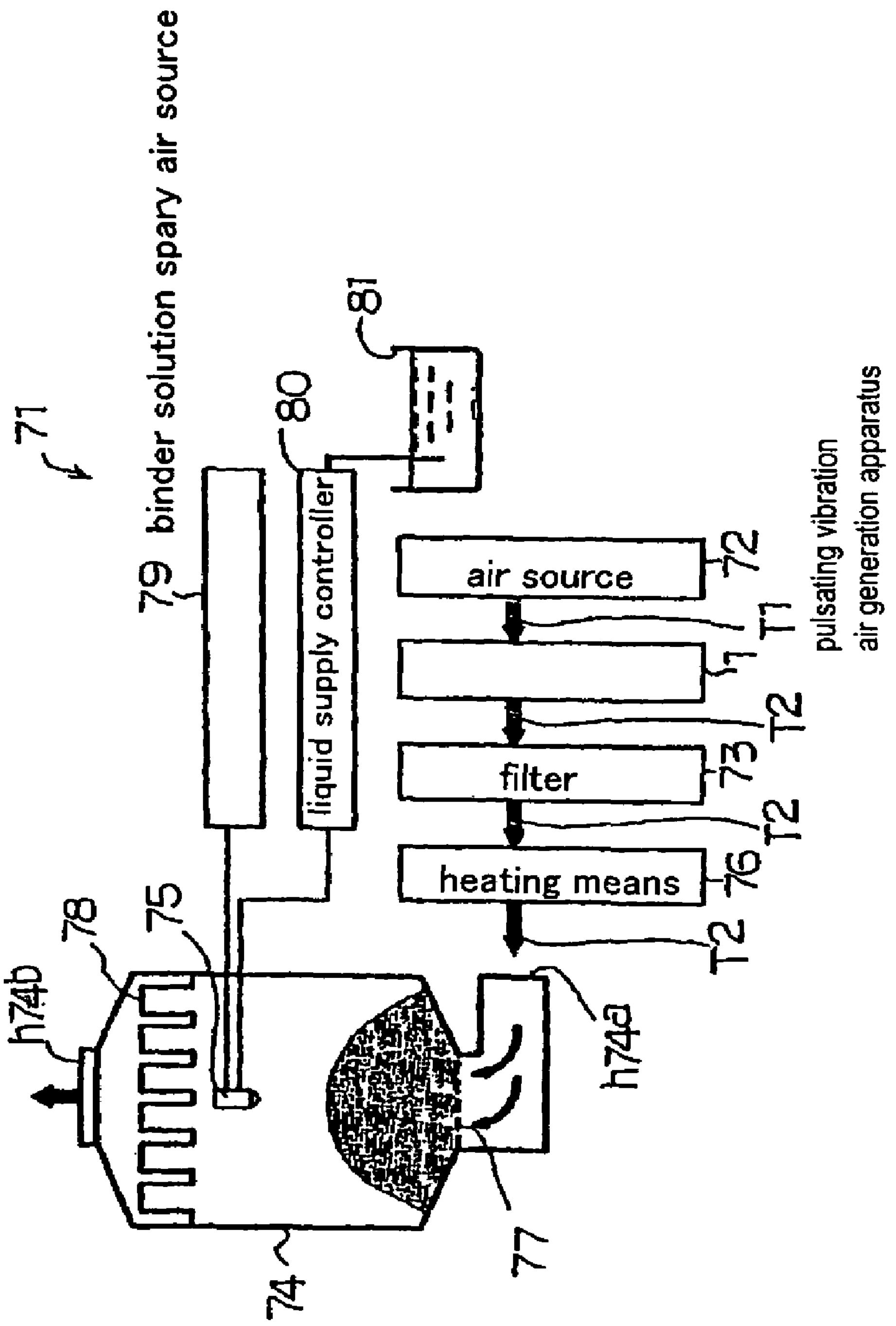
FIG. 12 is a structure view diagrammatically explaining a fluid-bed granulation apparatus using a pulsating vibration air generation apparatus 1 according to the present invention.
Figure 13A:
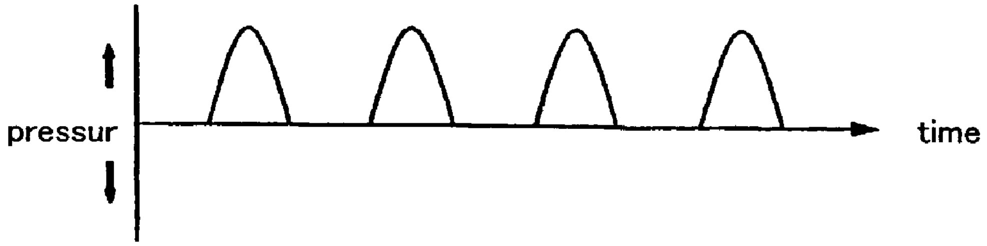
FIG. 13*a* shows a pulsating vibration air in which the peak amplitude is at positive pressure and the bottom amplitude is at the atmospheric pressure.
Figure 13B:
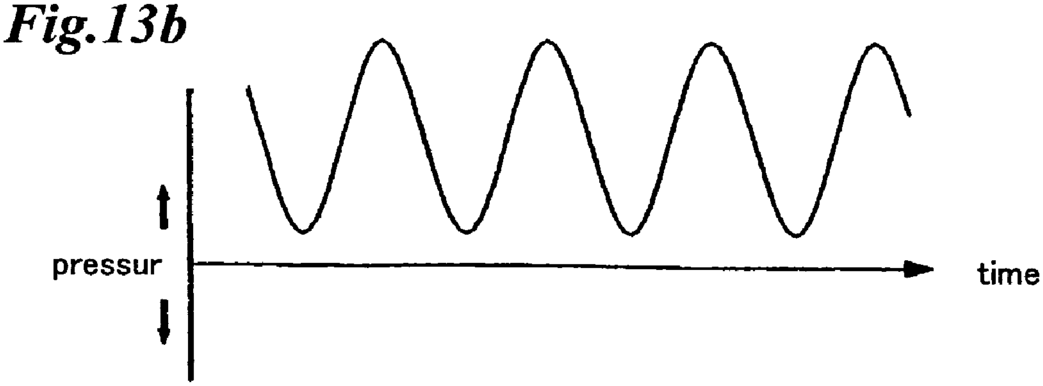
FIG. 13*b* shows a pulsating vibration air in which both of the peak amplitude and the bottom amplitude are at positive pressure.
Figure 14A:
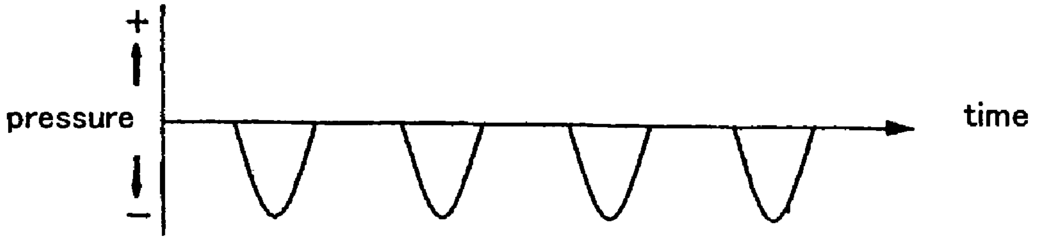
FIG. 14*a* shows a pulsating vibration air in which the bottom amplitude is at negative pressure and the peak amplitude is at the atmospheric pressure.
Figure 14B:
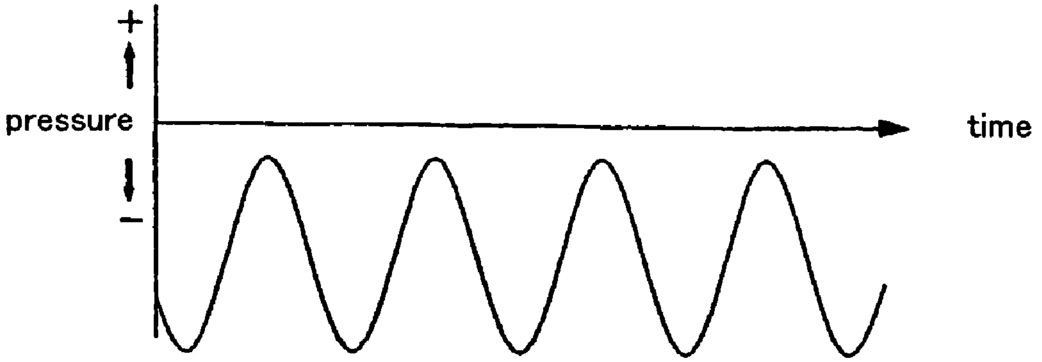
FIG. 14*b* shows a pulsating vibration air in which both of the peak amplitude and the bottom amplitude are at negative pressure.
Figure 15:
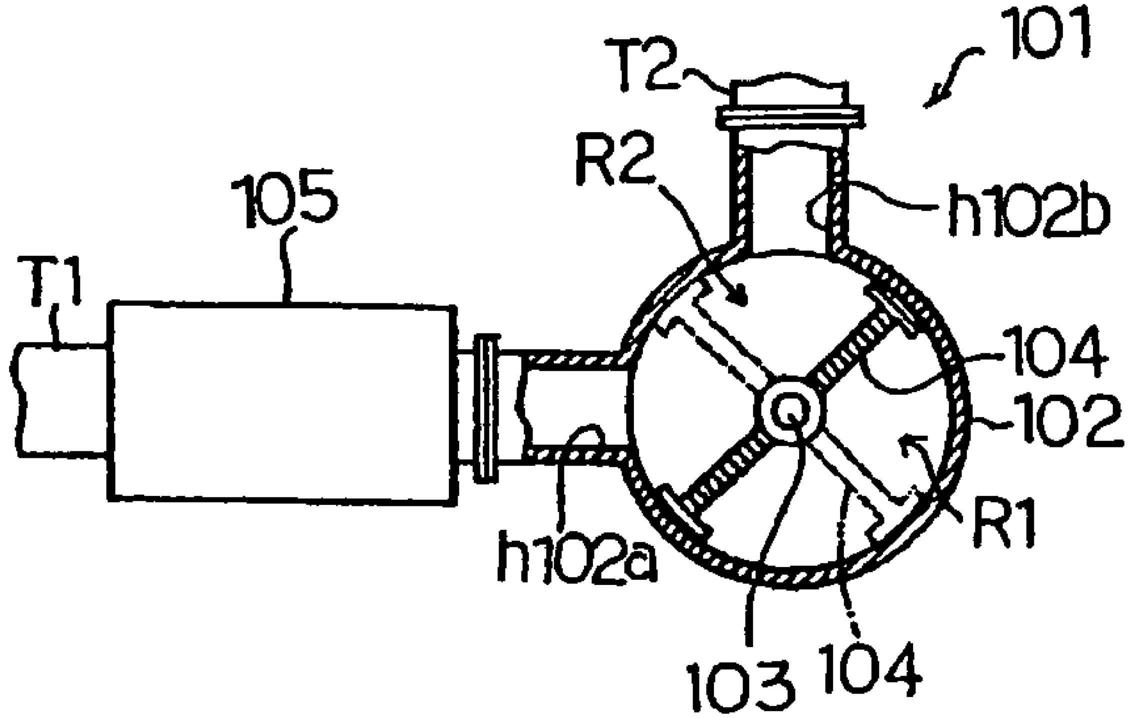
FIG. 15 is an explanatory view showing one embodiment of a pulsating vibration air generation apparatus that has been already proposed by the inventors of the present invention.
Figure 16:
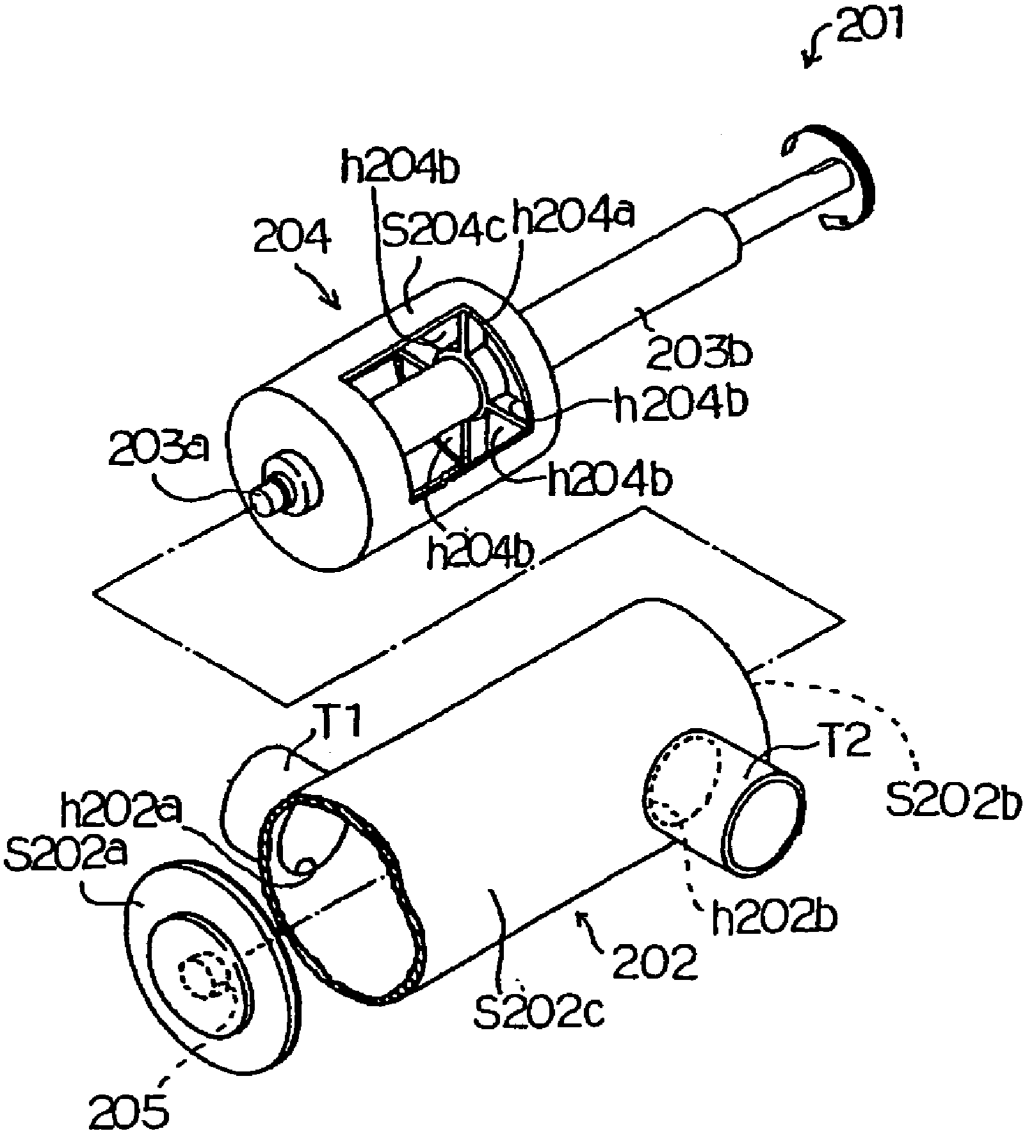
FIG. 16 is an exploded perspective view explaining other embodiment of a pulsating vibration air generation apparatus that has been already proposed by the inventors of the present invention.

FIG. 12 is a structure view diagrammatically explaining a fluid-bed granulation apparatus using the pulsating vibration air generation apparatus 1 according to the present invention.

The fluid-bed granulation apparatus 71 has an air source 72, a filter 73, the pulsating vibration air generation apparatus 1, a granulation tank 74, a pipe T2 connecting the granulation tank 74 and the pulsating vibration air generation apparatus 1, a pipe T1 connecting the air source 72 and the pulsating vibration air generation apparatus 1, a binder spray means 75 and a heating means 76.

Blower is used as the air source 72 in the fluid-bed granulation apparatus 71.

One end of the pipe T1 is connected to the air communication port (see the air communication port h2*a* in FIG. 5) of the pulsating vibration air generation apparatus 1 and the other end thereof is connected to the discharge port of the air source (blower) 52.

Catch basin 77 formed with a porous body is provided at the lower part of the granulation tank 74.

Air inflow port h74*a* is provided lower than the catch basin 77 in the granulation tank 74.

Air discharge port h74*b* is provided at the top of the granulation tank 74.

The member indicated with the reference numeral 78 in FIG. 12 is a bag filter provided so as to prevent the powder material and the material under granulation from being emitted to the atmosphere while the powder material stored in the granulation tank 74 is granulated and the bag filter 78 is provided at the upper part in the granulation tank 78.

One end of the pipe T2 is connected to the air communication port (see the air communication port h2*b* in FIG. 5) of the pulsating vibration air generation apparatus 1 and the other end of the pipe T2 is connected to the air inflow port h74*a* of the granulation tank 74.

The filter 73 is provided in removing the dust in the atmosphere and is provided in midstream of the pipe T2.

The heating means 76 is provided in heating the pulsating vibration air of positive pressure which is to be supplied to the air inflow port h74*a* of the granulation tank 74 with a view to obtain the resultant product by drying the powder under granulation or the granulated material (granule) when the powder material put in the granulation tank 74 is granulated. In this embodiment, the heating means 76 is provided in midstream of the pipe T2.

The binder spray means 75 is provided at a fixed position in the granulation tank 74.

Air source 79 for spraying a binder solution and a control means 80 for supplying the liquid are connected to the binder spray means 75.

The air source 79 for spraying a binder solution is designed to control the supply amount of compressed gas to be supplied to the binder spray means 75 to be a fixed supply amount.

The control means 80 for liquid supply is connected to a storage tank 81 of a binder solution so as to supply a fixed amount of binder solution stored in the storage tank 81 of a binder solution to the binder spray means 75.

For spraying a binder from the binder spray means 75, the air source 79 for spraying a binder solution is driven at a fixed drive amount and the control means 80 for liquid supply is driven at a fixed drive amount.

Then, a fixed amount of binder solution stored in the storage tank 81 of a binder solution is supplied into the binder spray means 75 from the control means 80 for liquid supply and a fixed amount of compressed gas is supplied into the binder spray means 75 from the air source 79 for spraying a binder solution, so that a drop of a binder solution is sprayed from the binder spray means 75 like a mist at a fixed spray amount.

Next, the method for granulating the powder material (primary particle) stored on the catch basin 77 in the granulation tank 74 into a granulated material (granule, namely secondary particle) is exemplified.

At first the powder material (primary particle) as a raw material is put in the catch basin 77 in the granulation tank 74.

Simultaneously a binder solution with a fixed concentration is put in the storage tank 81 of binder solution.

Next, the air source (blower) 72 is driven at a fixed drive amount.

The rotary drive means (not shown) connected to the rotary shaft 3*b* of the pulsating vibration air generation apparatus 1 is also driven to be rotated at a fixed drive amount.

Thus, a predetermined pulsating vibration air of positive pressure is generated in the pneumatic transport pipe (piping) T2.

The powder material (first particle) on the catch basin 77 in the granulation tank 74 is controlled to be uniformly mixed with the pulsating vibration air of positive pressure to be dispersed and fluidized by controlling the drive amount of air source (blower) 72 and the drive amount of rotary drive means (not shown) connected to the rotary shaft 3*b* of the pulsating vibration air generation apparatus 1.

Then, according to a predetermined operation program, the heating means is heated and the pulsating vibration air of positive pressure supplied to the air inflow port h74*a* of the granulation tank 74 is heated.

Further, according to the predetermined operation program, a binder drop is sprayed from the binder spray means 75 like a mist at a fixed spray amount.

After the powder material (first particle) in the granulation tank 74 is grown to a granulated material with a desired particle diameter (granule, namely secondary particle), the binder drop is stopped to be sprayed from the binder spray means 75, then the pulsating vibration air of positive pressure heated to a fixed temperature is supplied into the granulation tank 74 according to the predetermined operation program until the granulated material (granule, namely secondary particle) is dried well.

Then, the positive pulsating vibration air of positive pressure is stopped to be supplied in the granulation tank 74, the temperature in the granulation tank 74 is returned to a room temperature, and the granulated material (granule, namely secondary particle) is taken out of the granulation tank 74 into a desired place (for example, a storage tank).

According to this fluid-bed granulation apparatus 71, the pulsating vibration air generation apparatus of positive pressure is generated with the pulsating vibration air generation apparatus 1, so that the pulsating vibration air of positive pressure generated by the pulsating vibration air generation apparatus of the present invention is hardly attenuated.

Therefore, even if the pipe T2 is long in the fluid-bed granulation apparatus 71, a pulsating vibration air of positive pressure that is hardly attenuated is supplied in the granulation tank 74 through the pipe T2.

So, it does not occur that the powder material (first particle) which is a raw material on the catch basin 77 in the granulation tank 74 is blown up to the upper part of the granulation tank 74 or is blown up relatively lower in the granulation tank 74 like blow hole phenomenon because of the strong and weak pulsation of the positive pulsating vibration air supplied from the air inflow port h74*a* of the granulation tank 74. Therefore, the powder material (first particle) is mixed with the pulsating vibration air of positive pressure to be dispersed and fluidized without causing blow hole phenomenon.

The fluid-bed granulation apparatus 71 easily fluidized the powder material (first particle) as a raw material to be granulated which is put on the catch basin 77 in the granulation tank 74, so that an objective granulation material (granule, namely second particle) can be efficiently produced from the powder material (first particle) to be granulated with the fluid-bed granulation apparatus 71.

Further, using the fluid bed granulation apparatus 71, the powder material (first particle) that has been difficult to be fluidized is easily fluidized, thereby producing the granulation material (granule, namely second particle) of the powder material (first particle) that has been considered to be difficult to be produced in the prior art.

According to the fluid-bed granulation apparatus 71, while the pulsating vibration air of positive pressure is generated, the pulsating vibration air generation apparatus 1 itself does not cause any vibration, so that the pipe T2 connected to the pulsating vibration air generation apparatus and the granulation tank 74 connected to the pipe T2 are scarcely vibrated.

Further, according to the fluid-bed granulation apparatus 71, when the granulation operation is executed for a long time, the connected parts of the members constituting the fluid-bed granulation apparatus 71 are not loosened, staggered, or removed.

The above-mentioned pneumatic transportation apparatus 51, powder removing apparatus 61, and fluid-bed granulation apparatus 71 are only exemplifications of the usage of the pulsating vibration air generation apparatus according to the present invention. The pulsating vibration air generation apparatus of the present invention can be used for the apparatus that requires a pulsating vibration air sharply and quickly controlled in turning on and off operation at a fixed frequency with sharp and hardly attenuated peak and valley.

In each one of the pneumatic transportation apparatus 51, the powder removing apparatus 61, and the fluid-bed granulation apparatus 71, an embodiment using the pulsating vibration air generation apparatus 1 as the pulsating vibration air generation apparatus according to the present invention is explained. However, it goes without saying that the pulsating vibration air generation apparatus 1A and the pulsating vibration air generation apparatus 1B may be used in place of the pulsating vibration air generation apparatus 1 in each one of the pneumatic transportation apparatus 51, the powder removing apparatus 61, and the fluid-bed granulation apparatus 71.

As mentioned above, according to the pulsating vibration air generation apparatus of the present invention, the rotary body with a communication passage is rotated in the tubular hollow space provided in the main body of pulsating vibration air generation apparatus in such a manner the periphery side of the rotary body slides on the inner surface forming the tubular hollow space in the main body. When the two air communication ports provided in the main body of pulsating vibration air generation apparatus are communicated by the communication passage provided in the rotary body and the compressed gas supplied from one of the two air communication port provided in the main body of pulsating vibration air generation apparatus is discharged from the other air communication port. When one of the two air communication ports is inhaled, an inhaled air flow is generated at the other air communication port. Therefore, a pulsating vibration air of positive pressure or negative pressure sharply and quickly controlled in turning on and off operation at a fixed frequency with sharp and hardly attenuated peak and valley can be generated with the pulsating vibration air generation apparatus.

Further, according to this pulsating vibration air generation apparatus, open and close operations of the two air communication ports provided in the main body of pulsating vibration air generation apparatus can be achieved by the rotation of the rotary body with the communication passage, so that the pulsating vibration air generation apparatus itself hardly causes any remarkable vibration while a pulsating vibration air of positive pressure or of negative pressure is generated.

As the result, the pulsating vibration air generation apparatus can be preferably used for the apparatus using a pneumatic power such as a pneumatic transportation apparatus, a powder removing apparatus, and a fluid-bed granulation apparatus which require a pulsating vibration air of positive pressure or negative pressure sharply and quickly controlled in turning on and off operation at a fixed frequency with sharp and hardly attenuated peak and valley, and which need not application of vibration thereon.

In the pulsating vibration air generation apparatus of the present invention, the outer surface on which each one of the two air communication holes of the main body of pulsating vibration air generation apparatus mentioned above is provided is flat, therefore, there generates no gap for the connected part of the main body of pulsating vibration air generation apparatus and each pipe when a pipe is connected to each one of the two air communication ports of the main body respectively.

Therefore, dust and other powder are not gathered at the connected part of each pipe and the main body of pulsating vibration air generation apparatus, thereby keeping the pulsating vibration air generation apparatus clean. Further, the clean room or other room in which the pulsating vibration air generation apparatus is provided is kept clean for a long time.

In the pulsating vibration air generation apparatus of the present invention, the above-mentioned pulsating vibration air generation apparatus is used, and the compressed air source is connected to one of the two air communication ports of the main body of pulsating vibration air generation apparatus, when the exhaling air source is driven to rotate the rotary body at a fixed rotation speed in the main body, a pulsating vibration air of positive pressure which sharply and quickly controlled in turning on and off operation at a fixed frequency with sharp and hardly attenuated peak and valley can be generated from the other one of the two air communication ports provided in the main body.

Open and close operations of the two air communication holes provided in the main body of pulsating vibration air generation apparatus are achieved by the rotation of the rotary body having the communication passage, therefore, the pulsating vibration air generation apparatus itself scarcely causes any remarkable vibration while a positive pulsating vibration air is generated.

In the pulsating vibration air generation apparatus of the present invention, the above-mentioned pulsating vibration air generation apparatus is used, and the inhaling air source is connected to one of the two air communication port of the main body of pulsating vibration air generation apparatus, when the inhaling air source is driven to rotate the rotary body at a fixed rotation speed in the main body, a pulsating vibration air of negative pressure which sharply and quickly controlled in turning on and off operation at a fixed frequency with sharp and hardly attenuated peak and valley can be generated from the other one of the two air communication holes provided in the main body.

Open and close operations of the two air communication holes provided in the main body of pulsating vibration air generation apparatus are achieved by the rotation of the rotary body having the through hole, therefore, the pulsating vibration air generation apparatus itself scarcely causes any remarkable vibration while a negative pulsating vibration air is generated.

In the pulsating vibration air generation apparatus of the present invention, the packing member for airtightly sealing between the rotary shaft and the shaft hole formed in the main body of pulsating vibration air generation apparatus is provided. When a compressed gas is supplied from one of the two air communication port provided in the main body of pulsating vibration air generation apparatus in order to produce a pulsating vibration air of positive pressure, the compressed gas thus supplied from one air communication port does not leak to the atmosphere from the connection of the rotary shaft and the shaft hole formed in the main body. In addition, when one of the two air communication ports provided in the main body of pulsating vibration air generation apparatus is inhaled in order to produce a pulsating vibration air of negative pressure, the atmospheric air is not inhaled from the connection of the rotary shaft and the shaft hole provided in the main body.

Therefore, according to thus constructed pulsating vibration air generation apparatus, even when a positive pulsating vibration air is generated or a negative pulsating vibration air is generated, a positive or a negative pulsating vibration air can be generated while reducing the energy loss against the driving amount of air source (a compressed air source for generating a positive pulsating vibration air and an inhaling air source for generating a negative pulsating vibration air).

The invention claimed is:

1. A pulsating vibration air generation apparatus, comprising:

a main body defining a tubular hollow space with which two air communication ports are associated, one of said two communication ports being connected to an air source; and a cylindrical rotary body situated for rotation in said tubular hollow space, said cylindrical rotary body having a rotary shaft at a position in alignment with the center axis of said tubular hollow space and a peripheral side surface so as to slide on the surface forming said tubular hollow space, said rotary shaft being connected to a rotary source for rotating said rotary shaft, and said cylindrical rotary body further having an air communication passage penetrating said cylindrical rotary body, wherein:

said pulsating vibration air generation apparatus generates pulsating vibration air inside a pipe connected to the other of said two air communication ports of said main body by rotating said cylindrical rotary body by the rotary drive source while driving the air source.

2. The pulsating vibration air generation apparatus as defined in claim 1, wherein:

both of the outer surfaces of said main body are formed flat, where each one of said two air communication ports is provided.

3. The pulsating vibration air generation apparatus as defined in claim 1, wherein:

the air source is an exhaling air source.

4. The pulsating vibration air generation apparatus as defined in claim 1, wherein:

the air source is an inhaling air source.

5. The pulsating vibration air generation apparatus as defined in claim 1, further comprising:

a packing member for creating an airtight seal between said rotary shaft and a shaft hole formed in said main body.

6. The pulsating vibration air generation apparatus as defined in claim 2, wherein:

the air source is an exhaling air source.

7. The pulsating vibration air generation apparatus as defined in claim 2, wherein:

the air source is an inhaling air source.

8. The pulsating vibration air generation apparatus as defined in claim 2, further comprising:

a packing member for creating an airtight seal between said rotary shaft and a shaft hole formed in said main body.

9. The pulsating vibration air generation apparatus as defined in claim 3, further comprising:

a packing member for creating an airtight seal between said rotary shaft and a shaft hole formed in said main body.

10. The pulsating vibration air generation apparatus as defined in claim 4, further comprising:

a packing member for creating an airtight seal between said rotary shaft and a shaft hole formed in said main body.

* * * * *